(12) United States Patent
Nagarajan et al.

(10) Patent No.: US 12,078,993 B2
(45) Date of Patent: Sep. 3, 2024

(54) GENERATION OF AUTONOMY MAP FOR AUTONOMOUS VEHICLE

(71) Applicant: ANI TECHNOLOGIES PRIVATE LIMITED, Bengaluru (IN)

(72) Inventors: Sathya Narayanan Nagarajan, Bengaluru (IN); Gaurav Agarwal, Fremont, CA (US)

(73) Assignee: ANI TECHNOLOGIES PRIVATE LIMITED, Bengaluru (IN)

( * ) Notice: Subject to any disclaimer, the term of this patent is extended or adjusted under 35 U.S.C. 154(b) by 155 days.

(21) Appl. No.: 16/787,667

(22) Filed: Feb. 11, 2020

(65) Prior Publication Data

US 2020/0356100 A1    Nov. 12, 2020

(30) Foreign Application Priority Data

May 9, 2019 (IN) .............................. 201941018673

(51) Int. Cl.
  *G05D 1/02* (2020.01)
  *G01C 21/34* (2006.01)
  *G05D 1/00* (2006.01)

(52) U.S. Cl.
  CPC ....... *G05D 1/0214* (2013.01); *G01C 21/3492* (2013.01); *G05D 1/0219* (2013.01); *G05D 1/0257* (2013.01)

(58) Field of Classification Search
  CPC .. G05D 1/0214; G05D 1/0257; G05D 1/0219; G05D 1/0221; G05D 1/0088; G05D 1/0274; G05D 2201/0213; G05D 1/0061; G05D 1/0276; G05D 1/0212; G01C 21/3492; G01C 21/3804; G01C 21/3691; G01C 21/3602; G01C 21/3461; G01C 21/3896; G01C 21/3446; G01C 21/3667; G01C 21/32; B60W 30/00; B60W 30/12; B60W 2556/40; B60W 60/0011; B60W 60/0053; B60W 60/0059; B60W 2050/146; B60W 2552/05; B60W 2556/50; B60W 30/18; B60W 40/02; B60W 40/00; B60W 50/14; B60W 30/14; B60W 40/06; B60W 2552/00; B60W 2050/143; G06F 16/29; G08G 1/096816; G08G 1/096725; G08G 1/09685; G08G 1/0969

See application file for complete search history.

(56) References Cited

U.S. PATENT DOCUMENTS

| 10,935,974 | B1* | 3/2021 | Fields | ............... B60W 60/0053 |
| 11,703,347 | B2* | 7/2023 | Robert | ................. G05D 1/0088 |
| | | | | 701/450 |
| 2017/0227971 | A1* | 8/2017 | Shimotani | ............ G06V 20/588 |

(Continued)

*Primary Examiner* — Abdalla A Khaled
(74) *Attorney, Agent, or Firm* — CHIP Law Group

(57) ABSTRACT

Generation of an autonomy map for assisting an autonomous vehicle includes extracting the historical autonomy information associated one or more route segments of one or more routes. An autonomy level for each route segment is determined based on the extracted historical autonomy information. A digital autonomy map is generated including each route segment of at least one route such that each route segment is tagged with the determined autonomy level. The autonomy level of each route segment is dynamically updated in real-time for providing real-time driving assistance to the autonomous vehicle.

21 Claims, 11 Drawing Sheets

(56) References Cited

U.S. PATENT DOCUMENTS

| | | | |
|---|---|---|---|
| 2017/0234689 A1* | 8/2017 | Gibson | B60W 60/0053 |
| | | | 701/25 |
| 2018/0057015 A1* | 3/2018 | Barke | B60W 50/14 |
| 2018/0266833 A1* | 9/2018 | Carlson | G01C 21/3667 |
| 2018/0292833 A1* | 10/2018 | You | G05D 1/0212 |
| 2018/0342113 A1* | 11/2018 | Kislovskiy | G08G 1/202 |
| 2019/0049259 A1* | 2/2019 | Galan-Oliveras | |
| | | | G01C 21/3415 |
| 2019/0113353 A1* | 4/2019 | Shimizu | B60W 50/082 |
| 2019/0186947 A1* | 6/2019 | Rockmore | B60W 60/00 |
| 2019/0204827 A1* | 7/2019 | Bhalla | B60W 50/16 |
| 2019/0362162 A1* | 11/2019 | Averbuch | G01C 21/3815 |
| 2020/0139992 A1* | 5/2020 | Oba | G08G 1/16 |
| 2020/0174470 A1* | 6/2020 | Park | B60W 60/0053 |
| 2020/0192386 A1* | 6/2020 | Stenneth | G05D 1/0214 |
| 2020/0216086 A1* | 7/2020 | Lenke | G06F 3/167 |
| 2020/0264613 A1* | 8/2020 | Sturges | G05D 1/0217 |
| 2020/0269861 A1* | 8/2020 | Liffman | B60W 50/14 |
| 2020/0309543 A1* | 10/2020 | Voznesensky | G01C 21/3407 |
| 2020/0310450 A1* | 10/2020 | Reschka | B60W 60/0011 |
| 2021/0331709 A1* | 10/2021 | Kim | A61B 5/165 |

\* cited by examiner

GENERATION OF AUTONOMY MAP FOR AUTONOMOUS VEHICLE

CROSS-RELATED APPLICATIONS

This application claims priority of Indian Application Serial No. 201941018673, filed May 9, 2019, the contents of which are incorporated herein by reference.

FIELD

Various embodiments of the disclosure relate generally to driving-assistance systems. More specifically, various embodiments of the disclosure relate to generation of an autonomy map for an autonomous vehicle.

BACKGROUND

With the advancement of technologies and demand of vehicles for modern day travels, autonomous vehicles are emerging rapidly in the transportation industry. An autonomous vehicle can drive safely on its own without human intervention during a part of a journey or the entire journey. The autonomous vehicle includes components, such as sensors, actuators, smart computing devices, and communication devices, that enable automatic generation of control signals for self-driving and navigating along various routes. These components interact with each other and collect and generate various control signals in real time to provide an advance driver-assistance system (ADAS) to the autonomous vehicle or a driver of the autonomous vehicle in the driving process that enhances the overall safety.

Generally, the autonomous vehicles operate in accordance with various levels of autonomy. According to the Society of Automotive Engineers (SAE) standards, the autonomous vehicles are provided with six levels of autonomy. The six levels range from level "0" through level "5". Here, level "0" corresponds to "no automated assistance", and requires the driver to control various driving-related functionalities of the autonomous vehicle. Level "5" corresponds to "full automation", and does not require any intervention from the driver. The autonomous vehicle may switch through the autonomy levels while transiting from one location to another location. Thus, the computation of the autonomy levels is very significant in order to ensure the safety of the autonomous vehicle as well as the driver and passengers travelling in the autonomous vehicle, along with other objects that are in the surrounding of the autonomous vehicle.

For efficient computation of the autonomy levels, various internal and external factors must be taken into consideration. Further, the driver should be well aware of the switching between the autonomy levels well in advance. Instantaneous switching between the autonomy levels without prior notification to the driver or the autonomous vehicle may compromise the overall safety that is not desirable. Further, deploying the autonomous vehicle for a trip along with the driver is not always feasible considering the overall cost of the trip.

In light of the foregoing, there exists a need for a technical and reliable solution that takes into consideration the above-mentioned problems, challenges, and short-comings, and facilitates effective and efficient driving assistance systems for autonomous vehicles.

SUMMARY

Generation of an autonomy map for an autonomous vehicle is provided substantially as shown in, and described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
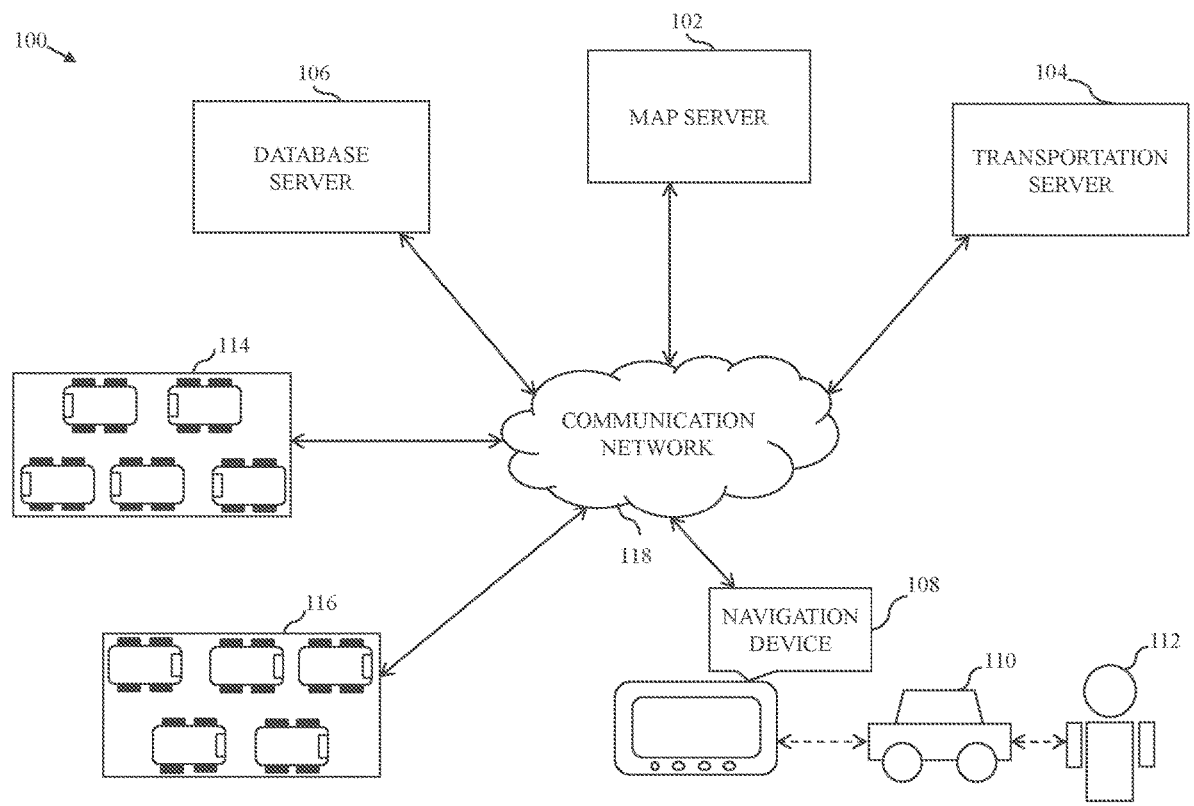
FIG. 1 is a block diagram that illustrates an environment for generating a digital autonomy map, in accordance with an exemplary embodiment of the disclosure.

Certain embodiments of the disclosure may be found in a disclosed apparatus for generating a digital autonomy map. Exemplary aspects of the disclosure provide a method and a system for generating the digital autonomy map for an autonomous vehicle. The method includes one or more operations that are executed by circuitry of a map server to generate the digital autonomy map. When a first autonomous vehicle is scheduled for a ride between a source location and a destination location, the circuitry may be configured to extract historical autonomy levels associated with one or more route segments of one or more routes of a geographical region. Each of the one or more routes may connect the source location with the destination location. Prior to the extraction, the historical autonomy levels may be generated based on at least historical driving conditions of the one or more route segments of the one or more routes and historical configuration of one or more sensors and processing components of one or more second autonomous vehicles that have traversed via the one or more routes in the past. The historical autonomy levels may be extracted from a database server based on a time or a time duration of a day associated with the first autonomous vehicle.

The circuitry may be further configured to generate the digital autonomy map for the first autonomous vehicle. The digital autonomy map may include the one or more route segments of at least one route connecting the source location with the destination location of the first autonomous vehicle. Each route segment on the digital autonomy map may be tagged with an autonomy level. The autonomy level may be determined based on the extracted historical autonomy levels. The circuitry may be further configured to render the digital autonomy map on a display of the first autonomous vehicle. The digital autonomy map may be utilized by the first autonomous vehicle for controlling and managing the transit operations between the source location and the destination location. For example, the transit operations may be controlled and managed based on at least navigation and autonomy information indicated by the digital autonomy map. The digital autonomy map generated for the first autonomous vehicle may be different from another digital autonomy map generated for another autonomous vehicle, when the first autonomous vehicle and another autonomous vehicle are associated with a different vehicle category and different sensor configuration.

The circuitry may be further configured to receive real-time autonomy levels associated with the one or more route segments of the at least one route from one or more third autonomous vehicles. The one or more third autonomous vehicles may be currently traversing the one or more route segments of the at least one route. The one or more third autonomous vehicles may be traversing the one or more route segments ahead of the first autonomous vehicle. The circuitry may be further configured to dynamically update the autonomy level of each route segment of the at least one route on the digital autonomy map. The autonomy level of each route segment may be dynamically updated based on at least the received real-time autonomy levels for providing real-time driving assistance to the first autonomous vehicle.

The circuitry may be further configured to receive first sensor data from the first autonomous vehicle. The circuitry may be further configured to receive second sensor data from the one or more third autonomous vehicles. The first sensor data and the second sensor data may include at least global positioning system (GPS) data, image data of an exterior environment, radio detection and ranging (RADAR) data, ultrasonic data, and light detection and ranging (LiDAR) data. The circuitry may be further configured to retrieve at least real-time route information of the at least one route from a route database, real-time weather information of the at least one route from a weather database, and real-time traffic information of the at least one route from a traffic database. The real-time route information may include at least a route segment type, speed restriction information, and obstruction information of each route segment of the at least one route. The real-time traffic information may include real-time traffic conditions associated with each route segment of the at least one route. The real-time weather information may include at least real-time temperature, fog, light, humidity, and pollution information associated with each route segment of the at least one route.

The circuitry may be further configured to dynamically update the autonomy level of each route segment of the at least one route based on at least one of the first sensor data, the second sensor data, the real-time route information, the real-time traffic information, and the real-time weather information. The circuitry may be further configured to dynamically update the autonomy level of each route segment of the at least one route based on a vehicle category of at least one of the first autonomous vehicle and the one or more third autonomous vehicles. The circuitry may be further configured to dynamically update the autonomy level of each route segment of the at least one route based on an operating state of one or more sensors and processing components of at least one of the first autonomous vehicle and the one or more third autonomous vehicles. By dynamically updating the digital autonomy map generated for the first autonomous vehicle, the transit operations of the first autonomous vehicle between the source location and the destination location may be controlled and managed in an effective and efficient manner.

Thus, for deployment of the first autonomous vehicle for a trip by a transport service provider (e.g., a cab service provider such as OLA), various factors (such as conditions of the selected route for the trip, weather conditions associated with the selected route, health of the first autonomous vehicle, traffic conditions associated with the selected route, necessity of a driver for driving the first autonomous vehicle, and the like) may be important. The deployment of the first autonomous vehicle along with the driver may not be always feasible due to the increased operating cost. Thus, the generation of the digital autonomy map and the dynamic update of the generated digital autonomy map after a regular interval of time may facilitate an efficient and effective planning of the first autonomous vehicle for the trip prior to the deployment of the first autonomous vehicle for the trip. Such efficient and effective planning may assist the transport service provider to optimize utilization of available resources, improve user comfort and safety, and thereby improve cost effectiveness. The disclosed method and system facilitate an efficient, effective, and comprehensive way of generating and updating the digital autonomy map for the first autonomous vehicle.

FIG. 1 is a block diagram that illustrates an environment 100 for generating a digital autonomy map, in accordance with an exemplary embodiment of the disclosure. The environment 100 includes a map server 102, a transportation server 104, a database server 106, and a navigation device 108 of an autonomous vehicle 110 associated with a user 112. The environment 100 further includes autonomous vehicles 114 and autonomous vehicles 116. In an embodiment, the map server 102, the transportation server 104, the database server 106, the navigation device 108, the autonomous vehicle 110, the autonomous vehicles 114, and the autonomous vehicles 116 may be coupled to each other via a communication network 118.

The map server 102 may include suitable logic, circuitry, interfaces, and/or code, executable by the circuitry, that may be configured to perform one or more operations for generating the digital autonomy map and dynamically updating the digital autonomy map. The map server 102 may be a computing device, which may include a software framework, that may be configured to create the map server implementation and perform the various operations associated with the digital autonomy map. The map server 102 may be realized through various web-based technologies, such as, but not limited to, a Java web-framework, a .NET framework, a professional hypertext preprocessor (PHP) framework, a python framework, or any other web-application framework. The map server 102 may also be realized as a machine-learning model that implements any suitable machine-learning techniques, statistical techniques, or probabilistic techniques. Examples of such techniques may include expert systems, fuzzy logic, support vector machines (SVM), Hidden Markov models (HMMs), greedy search algorithms, rule-based systems, Bayesian models (e.g., Bayesian networks), neural networks, decision tree learning methods, other non-linear training techniques, data fusion, utility-based analytical systems, or the like. Examples of the map server 102 may include, but are not limited to, a personal computer, a laptop, or a network of computer systems.

In an embodiment, the map server 102 may be configured to communicate with the transportation server 104 to identify a source location and a destination location associated with the autonomous vehicle 110. The map server 102 may be further configured to extract historical autonomy levels associated with one or more route segments of one or more routes of a geographical region including the source location and the destination location. The historical autonomy levels may be extracted from the database server 106.

In an embodiment, the map server 102 may be further configured to generate the digital autonomy map based on at least the extracted historical autonomy levels. The digital autonomy map may be further generated based on at least one of a vehicle category and sensor configuration associated with the autonomous vehicle 110. Different categories of autonomous vehicles may have different autonomy maps even though the different categories of autonomous vehicles have to follow the same route to reach the destination location. The generated digital autonomy map (hereinafter, "the digital autonomy map") may include the one or more route segments of at least a first route selected from the one or more routes. Each route segment on the digital autonomy map may be tagged with an autonomy level. The digital autonomy map may be utilized by the autonomous vehicle 110 to navigate between the source location and the destination location.

In an embodiment, the map server 102 may be further configured to receive real-time information, such as real-time autonomy levels from the autonomous vehicles 116, real-time first sensor data (hereinafter, "the first sensor data") from the autonomous vehicle 110, real-time second sensor data (hereinafter, "the second sensor data") from the autonomous vehicles 116, real-time route information of the first route from the database server 106, real-time weather information of the first route from the database server 106, and real-time traffic information of the first route from the database server 106. The map server 102 may be further configured to dynamically update the digital autonomy level of each route segment of the first route based on the received real-time information. The map server 102 may be further configured to dynamically update the digital autonomy level of each route segment of the first route based on a vehicle category of at least one of the autonomous vehicle 110 and the autonomous vehicles 116. The map server 102 may be further configured to dynamically update the digital autonomy level of each route segment of the first route based on an operating state of one or more sensors and processing components of at least one of the autonomous vehicle 110 and the autonomous vehicles 116. In an embodiment, the map server 102 may be further configured to provide one or more navigation instructions and commands to the autonomous vehicle 110 to navigate between the source location and the destination location. Various operations of the map server 102 have been described in detail in conjunction with FIGS. 2, 5A-5B, 6A-6B, and 7.

The transportation server 104 may include suitable logic, circuitry, interfaces, and/or code, executable by the circuitry, that may be configured to perform one or more operations associated with fleet management and allocation. The transportation server 104 may be a computing device, which may include a software framework, that may be configured to create the transportation server implementation and perform the various operations associated with the fleet management and allocation. The transportation server 104 may be realized through various web-based technologies, such as, but not limited to, a Java web-framework, a .NET framework, a PHP framework, a python framework, or any other web-application framework. Examples of the transportation server 104 may include, but are not limited to, a personal computer, a laptop, or a network of computer systems.

In an embodiment, the transportation server 104 may be configured to process, control, and manage various functionalities and operations associated with the fleet management and allocation, such as booking request reception, route identification, route selection, fare determination, vehicle selection, vehicle allocation, driver selection, and driver allocation. For example, the transportation server 104 may select the first route from the one or more routes based on at least an overall autonomy level of each route, real-time traffic conditions of each route, real-time environmental conditions of each route, a trip time associated with each route, and route preferences of the user 112 associated with the autonomous vehicle 110. Further, the transportation server 104 may select the driver from a set of available drivers based on at least the autonomy level of each route segment of the first route.

The transportation server 104 may be further configured to determine the source location and the destination location associated with the autonomous vehicle 110. The source location and the destination location may be determined based on at least one of the user 112, current position information of the autonomous vehicle 110, and current allocation status of the autonomous vehicle 110. The user 112 may be at least one of a driver or a passenger associated with the autonomous vehicle 110. For example, when a driver is not assigned to the autonomous vehicle 110 for a trip and the autonomous vehicle 110 is allocated to the passenger by the transportation server 104, the autonomous vehicle 110 may travel from a current location (i.e., a first source location of the autonomous vehicle 110) to a pick-up location (i.e., a first destination location of the autonomous vehicle 110) of the passenger. Thereafter, when the trip starts, the autonomous vehicle 110 may travel from the pick-up location (i.e., a second source location of the autonomous vehicle 110) to a drop-off location (i.e., a second destination location of the autonomous vehicle 110) of the passenger. In another example, when the driver is assigned to the autonomous vehicle 110 for the trip requested by the passenger and the driver is not present at a current location of the autonomous vehicle 110, the autonomous vehicle 110 may travel from the current location (i.e., a first source location of the autonomous vehicle 110) to a first pick-up location (i.e., a first destination location of the autonomous vehicle 110) of the driver. Further, after picking the driver, the autonomous vehicle 110 may travel from the first pick-up location (i.e., a second source location of the autonomous vehicle 110) to a second pick-up location (i.e., a second destination location of the autonomous vehicle 110) of the passenger. Thereafter, when the trip starts, the autonomous vehicle 110 may travel from the second pick-up location (i.e., a third source location of the autonomous vehicle 110) to a drop-off location (i.e., a third destination location of the autonomous vehicle 110) of the passenger.

In an embodiment, the transportation server 104 may be configured to allocate the autonomous vehicle 110 to the user 112 (such as the passenger) based on the source location and the destination location of each of the autonomous vehicle 110 and the user 112. Upon allocation of the autonomous vehicle 110 to the user 112, the transportation server 104 may be configured to generate the historical autonomy levels of the one or more routes segments of the one or more routes connecting the source location with the destination location. The historical autonomy levels may be generated based on the historical configuration of one or more sensors and processing components of the autonomous vehicles 114 and the historical driving conditions of the one or more route segments of the one or more routes. The historical driving conditions may be determined based on historical weather, traffic, or route conditions of the one or more route segments of the one or more routes. Further, the historical autonomy levels may be generated based on a time or a time duration of a day associated with the autonomous vehicle 110 for the transit operations between the source location and the destination location. Upon generation of the historical autonomy levels, the transportation server 104 may store the generated historical autonomy levels in the database server 106.

In an embodiment, the transportation server 104 may be configured to process other services and requests associated with a trip, and accordingly, may be configured to control, modify, and execute the other services and requests prior to the start of the trip or during the trip. In an embodiment, the transportation server 104 may be configured to receive a query from the map server 102 via the communication network 118. The query may be an encrypted message that is decoded by the transportation server 104 to determine one or more requests (initiated by the map server 102) for retrieving requisite information (such as sensor information, weather information, traffic information, route information, allocation information, autonomy information, or any combination thereof). In response to the determined one or more requests, the transportation server 104 may retrieve and communicate the requested information to the map server 102 via the communication network 118. Various operations of the transportation server 104 have been described in detail in conjunction with FIGS. 3, 6A-6B, and 7.

The database server 106 may include suitable logic, circuitry, interfaces, and/or code, executable by the circuitry, that may be configured to perform one or more database operations, such as receiving, storing, processing, and transmitting queries, data, or content. The database server 106 may be a data management and storage computing device that is communicatively coupled to the map server 102, the transportation server 104, the navigation device 108, the autonomous vehicle 110, the autonomous vehicles 114, and the autonomous vehicles 116 via the communication network 118 to perform the one or more operations. Examples of the database server 106 may include, but are not limited to, a personal computer, a laptop, or a network of computer systems.

In an embodiment, the database server 106 may be configured to manage and store various types of information such as real-time and historical route information of the one or more routes, real-time and historical traffic information associated with the one or more routes, real-time and historical weather information associated with the one or more routes, real-time and historical autonomy information associated with the one or more route segments of the one or more routes, and the like. In an embodiment, the database server 106 may be further configured to manage and store real-time position information of various autonomous vehicles such as the autonomous vehicle 110 and the autonomous vehicles 116. In an embodiment, the database server 106 may be further configured to manage and store real-time allocation status information and allocation information of the various autonomous vehicles. The allocation status information of each autonomous vehicle (such as the autonomous vehicle 110) may indicate whether each autonomous vehicle is available for new allocation or not corresponding to a new booking request. The allocation information of each autonomous vehicle (such as the autonomous vehicle 110) may indicate the driver, the passenger, the source location, the destination location, and the route information associated with each autonomous vehicle. In an embodiment, the database server 106 may be further configured to manage and store real-time and historical navigation information of the various autonomous vehicles.

In an embodiment, the database server 106 may be further configured to manage and store the first sensor data received from the autonomous vehicle 110 and the second sensor data received from the autonomous vehicles 116. The first sensor data and the second sensor data may include at least global positioning system (GPS) data, image data of an exterior environment, radio detection and ranging (RADAR) data, ultrasonic data, and light detection and ranging (LiDAR) data associated with the autonomous vehicle 110 and the autonomous vehicles 116, respectively. In an embodiment, the database server 106 may be further configured to receive a query from the map server 102 or the transportation server 104 via the communication network 118. The query may be an encrypted message that is decoded by the database server 106 to determine one or more requests for retrieving requisite information (such as sensor information, weather information, traffic information, route information, allocation information, autonomy information, or any combination thereof). In response to the determined one or more requests, the database server 106 may be configured to retrieve and communicate the requested information to the map server 102 or the transportation server 104 via the communication network 118. Various operations of the database server 106 have been described in detail in conjunction with FIGS. 4 and 7.

The navigation device 108 may include suitable logic, circuitry, interfaces and/or code, executable by the circuitry, that may be configured to perform one or more navigation operations. For example, the navigation device 108 may be a computing device that is utilized, by the autonomous vehicle 110 or the user 112 (such as the driver of the autonomous vehicle 110), to initiate a navigation request for navigating between the source location and the destination location. In an embodiment, the navigation device 108 may be configured to receive, from the map server 102 or the transportation server 104 via the communication network 118, one or more navigation interfaces that allow the autonomous vehicle 110 or the user 112 to interact with one or more computing devices, servers, or applications for performing the one or more navigation operations. Each navigation interface may include the digital autonomy map generated for the corresponding autonomous vehicle such as the autonomous vehicle 110. The digital autonomy map may present a satellite image of the geographical region including various route segments such as the one or more routes segments of the one or more routes associated with the source location and the destination location. Further, the digital autonomy map may present the autonomy level of each route segment that is dynamically updated in real-time by the map server 102 during the transit operation of the autonomous vehicle 110.

In an embodiment, the navigation device 108 may receive the one or more navigation interfaces based on the navigation request initiated by the user 112. In another embodiment, the navigation device 108 may automatically receive the one or more navigation interfaces based on the allocation of the autonomous vehicle 110 to the user 112 (such as the passenger) for the trip between the source location and the destination location of the passenger. Upon reception of the one or more navigation interfaces, the navigation device 108 may be utilized, by the autonomous vehicle 110 or the user 112 (such as the driver), to navigate between the source location and the destination location. In an embodiment, the autonomous vehicle 110 may utilize the digital autonomy map (along with the related navigation instructions and commands) associated with the one or more navigation interfaces to automatically transit between the source location and the destination location with or without any assistance from the user 112 (such as the driver). During the transit operation, the autonomous vehicle 110 may switch between the autonomy levels, and thus may control (i.e., increase or decrease) various vehicle dynamics such as propulsion, breaking, steering, speed, acceleration, or deacceleration associated with the autonomous vehicle 110 based on at least the autonomy level associated with each route segment of the first route. In another embodiment, when the autonomous vehicle 110 is being driven by the user 112 from the source location, a navigation interface may be utilized, by the user 112, to interact and provide one or more inputs for initiating the one or more operations associated with the navigation request. For example, the navigation device 108 may be utilized, by the user 112, to input the source location and the destination location for viewing the one or more routes connecting the source location with the destination location. Further, the navigation device 108 may be utilized, by the user 112, to select the first route from the one or more routes. Further, the navigation device 108 may be utilized, by the user 112, to view the autonomy level associated with each of the one or more route segments of the first route. Based on the autonomy level associated with each of the one or more route segments of the first route, the autonomous vehicle 110 may be partially or fully controlled, by the user 112, during the transit operation along the one or more route segments of the first route. In case of the fully autonomous mode, the transit operation is not intervened by the user 112, and the autonomous vehicle 110 may perform self-driving on its own during the transit operation along the one or more route segments of the first route. Various operations of the navigation device 108 have been described in detail in conjunction with FIGS. 2, 5A-5B, 6A-6B, and 7.

The autonomous vehicle 110 is a mode of transportation that is utilized, by the user 112 (such as the driver or the passenger), to commute from one location to another location. The autonomous vehicle 110 may include suitable logic, circuitry, interfaces and/or code, executable by the circuitry, that may be configured to control and perform one or more self-driving operations with or without any driving assistance from the driver associated the autonomous vehicle 110. In one embodiment, the autonomous vehicle 110 may be a self-driving vehicle deployed by a transport service provider to cater to travelling requirements of various passengers. In another embodiment, the autonomous vehicle 110 may be a self-driving vehicle that is privately owned by an individual such as the user 112. Examples of the autonomous vehicle 110 may include a car, a bus, an auto-rickshaw, or the like.

In an embodiment, the autonomous vehicle 110 may include various components (such as sensors, processors, and/or controllers), and software framework executed by the components for implementing various aspects of vehicle motion (such as propulsion, breaking, acceleration, steering, or the like) and auxiliary behavior (such as controlling lights, controlling temperature, or the like) of the autonomous vehicle 110. Examples of the sensors may include one or more LiDAR sensors, one or more RADAR sensors, one or more image acquiring modules, one or more infrared (IR) sensors, one or more location sensors, one or more ultrasonic sensors, and/or the like. Examples of the controllers may include one or more speed controllers, one or more temperature controllers, one or more throttle controllers, and/or the like. The performance of the autonomous vehicle 110 may be based on a configuration of the components of the autonomous vehicle 110. In an embodiment, the autonomous vehicle 110 may be configured to transmit the first sensor data to the map server 102, the transportation server 104, or the database server 106 via the communication network 118. The first sensor data may include at least the GPS data, the image data, the RADAR data, the ultrasonic data, and the LiDAR data, along with configuration information associated with the one or more sensors and processing components of the autonomous vehicle 110. The autonomous vehicle 110 may be further configured to transmit the vehicle dynamics data, such as propulsion data, breaking data, acceleration data, steering data, or the like, associated with the one or more route segments of the one or more routes to the map server 102, the transportation server 104, or the database server 106 via the communication network 118. The autonomous vehicle 110 may be further configured to transmit operating state data of the one or more sensors and processing components to the map server 102, the transportation server 104, or the database server 106 via the communication network 118. The operating state data may indicate the current operational status of the one or more sensors and processing components of the autonomous vehicle 110. For example, an operational status of the LiDAR sensor may represent whether the LiDAR sensor is currently ON or OFF. The operational status of the LiDAR sensor may also represent whether the LiDAR sensor is currently malfunctioning or functioning without any flaw. Further, in an embodiment, the first sensor data, the configuration information, the vehicle dynamics data, and/or the operating state data associated with the autonomous vehicle 110 may be utilized, by the map server 102, to dynamically update the digital autonomy map in real-time.

The autonomous vehicles 114 and 116 are one or more autonomous vehicles having similar functionalities and operations as described above with respect to the autonomous vehicle 110. For simplicity of the disclosure, it has been assumed that the autonomous vehicles 114 are one or more historical autonomous vehicles that may have previously traversed along the one or more route segments of the one or more routes connecting the source location with the destination location of the autonomous vehicle 110. Thus, the historical autonomy levels may be generated based on at least the historical configuration of the one or more sensors and processing components of the autonomous vehicles 114 and the historical driving conditions of the one or more route segments of the one or more routes. It has been further assumed that the autonomous vehicles 116 are one or more autonomous vehicles that may be currently traversing the one or more route segments of the one or more routes and may be ahead of the autonomous vehicle 110. In an embodiment, each of the autonomous vehicles 116 may be configured to transmit the second sensor data to the map server 102, the transportation server 104, or the database server 106 via the communication network 118. The second sensor data may include at least the GPS data, the image data, the RADAR data, the ultrasonic data, and the LiDAR data, along with configuration information associated with the one or more sensors and processing components of each of the autonomous vehicles 116. Each of the autonomous vehicles 116 may be further configured to transmit vehicle dynamics data, such as propulsion data, breaking data, acceleration data, steering data, or the like, associated with the one or more route segments of the one or more routes to the map server 102, the transportation server 104, or the database server 106 via the communication network 118. Each of the autonomous vehicles 116 may be further configured to transmit operating state data of the one or more sensors and processing components to the map server 102, the transportation server 104, or the database server 106 via the communication network 118. The operating state data may indicate the current operational status of the one or more sensors and processing components of each of the autonomous vehicles 116. For example, an operational status of the RADAR sensor may represent whether the RADAR sensor is currently ON or OFF. The operational status of the RADAR sensor may also represent whether the RADAR sensor is currently malfunctioning or functioning without any flaw. Further, in an embodiment, the second sensor data, the configuration information, the vehicle dynamics data, and/or the operating state data associated with the autonomous vehicles 116 may be utilized, by the map server 102, to dynamically update the digital autonomy map in real-time.

The communication network 118 may include suitable logic, circuitry, interfaces, and/or code, executable by the circuitry, that may be configured to transmit queries, messages, data, and requests between various entities, such as the map server 102, the transportation server 104, the database server 106, the autonomous vehicle 110, the autonomous vehicles 114, and/or the autonomous vehicles 116. Examples of the communication network 118 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof. Various entities in the environment 100 may be coupled to the communication network 118 in accordance with various wired and wireless communication protocols, such as Transmission Control Protocol and Internet Protocol (TCP/IP), User Datagram Protocol (UDP), Long Term Evolution (LTE) communication protocols, or any combination thereof.

In operation, the transportation server 104 may be configured to receive the navigation request from the autonomous vehicle 110. The navigation request may include the source location and the destination location associated with the autonomous vehicle 110 or the user 112 such as the driver or the passenger. In another embodiment, the transportation server 104 may be configured to generate the navigation request for the autonomous vehicle 110 based on the allocation of the autonomous vehicle 110 to the user 112.

In an embodiment, the transportation server 104 may be configured to generate the historical autonomy levels for the one or more route segments of the one or more routes. Each route of the one or more routes may connect the source location with the destination location. The historical autonomy levels may be generated based on at least the historical configuration of the one or more sensors and processing components of the autonomous vehicles 114 and the historical driving conditions associated with the one or more route segments. The historical autonomy levels may be further generated based on historical vehicle dynamics data (such as historical propulsion data, historical breaking data, historical acceleration data, historical steering data, or the like) of the autonomous vehicles 114. Further, the historical autonomy levels for each route segment may be generated based on at least one of the vehicle category of each autonomous vehicle and the operating state of the one or more sensors and processing components of each of the autonomous vehicles 114. For example, 5 autonomous vehicles of the same vehicle category (for example, sedan vehicles) traversed along a first route segment between 10:50 AM to 11:00 AM. In 2 autonomous vehicles, only 4 sensors out of 5 sensors were active. In another 2 autonomous vehicles, only 3 sensors out of 5 sensors were active. In 1 autonomous vehicle, all of the 5 sensors were active. In such a scenario, the historical autonomy levels may be generated based on one or more predefined rules. For example, for an autonomous vehicle with 90-100 percent active sensors, the historical autonomy level may be determined as 5. Further, for an autonomous vehicle with 80-90 percent active sensors, the historical autonomy level may be determined as 4. Further, for an autonomous vehicle with 70-80 percent active sensors, the historical autonomy level may be determined as 3. Further, for an autonomous vehicle with 60-70 percent active sensors, the historical autonomy level may be determined as 3, and so on. Thus, in the current exemplary scenario, the historical autonomy level for each of the 2 autonomous vehicles with 4 active sensors may be determined as 4. Similarly, the historical autonomy level for each of the 2 autonomous vehicles with 3 active sensors may be determined as 3, and the historical autonomy level for the 1 autonomous vehicle with 5 active sensors may be determined as 5. Upon generation of the historical autonomy levels, the transportation server 104 may store the historical autonomy levels associated with the one or more route segments of the one or more routes in the database server 106.

In an embodiment, in response to the navigation request, the map server 102 may be configured to extract, from the database server 106, the historical autonomy levels associated with the one or more route segments of the one or more routes. The historical autonomy levels may be extracted from the database server 106 based on the time or the time duration of the day associated with the autonomous vehicle 110 for the current transit operations between the source location and the destination location. The historical autonomy levels may also be extracted from the database server 106 based on the vehicle category of the autonomous vehicle 110. In an embodiment, the map server 102 may be further configured to determine the autonomy level of each of the one or more route segments of the one or more routes based on the historical autonomy levels associated with the one or more route segments of the one or more routes. For example, the autonomy level for a route segment for a time duration may be generated based on a statistical value (e.g., an average value) of the historical autonomy levels of the autonomous vehicles 114 associated with the same time duration and the same route segment. For example, 5 autonomous vehicles traversed along a second route segment between 10:10 AM to 10:20 AM and the historical autonomy levels of the 5 autonomous vehicles were generated as 5, 4, 5, 3, and 3. In such a scenario, the autonomy level for the first route segment between the 10:10 AM to 10:20 AM may be determined as an average value of the autonomy levels 5, 4, 5, 3, and 3 i.e., 4.

In an embodiment, the map server 102 may be further configured to generate the digital autonomy map for the autonomous vehicle 110. The digital autonomy map may include the one or more route segments of at least the first route connecting the source location with the destination location. The first route may be selected, by the transportation server 104, from the one or more routes based on at least one of the overall autonomy level of each route, the real-time traffic conditions along each route, the real-time environmental conditions along each route, the trip time associated with each route, or the route preferences of the user 112 associated with the autonomous vehicle 110. The user 112 may be at least one of the driver or the passenger associated with the autonomous vehicle 110. The driver may be selected from the set of available drivers based on at least the autonomy level of each route segment of the at least first route. For example, if it is determined that the autonomy level of the all the route segments of the first route is either 4 or 5, and thus the autonomous vehicle 110 does not require any driving assistance from the driver, then the driver is not selected for the autonomous vehicle 110. However, if it is determined that the autonomy level of at least one route segment of the first route is 3 or less, then the driver is selected for from the set of available drivers for providing the driving assistance to the autonomous vehicle 110.

In an embodiment, the map server 102 may be further configured to tag each route segment of the first route based on the determined autonomy level. Thus, the map server 102 may generate the digital autonomy map such that each route segment on the digital autonomy map is tagged with the determined autonomy level. For example, there are 3 route segments (such as a first route segment, a second route segment, and a third route segment) of the first route that is connecting the source location with the destination location. Further, the autonomy levels of the first route segment, the second route segment, and the third route segment are determined as 4, 5, and 4. The map server 102 may generate the digital autonomy map including at least visual representation of the first route segment, the second route segment, and the third route segment of the first route such that each of the first route segment, the second route segment, and the third route segment is tagged with the autonomy levels 4, 5, and 4, respectively. The tagging may be executed by using number-based tagging, color-based tagging, voice-based tagging, or any combination thereof.

In an exemplary embodiment, the number-based tagging of a route segment (such as the first route segment) may be executed by tagging the route segment using an integer such as "0", "1", "2", "3", "4", or "5". The integer "0" may correspond to an "autonomy level 0" that does not include automated assistance. The integer "1" may correspond to an "autonomy level 1" that includes the driver assistance and at least one advanced driver-assistance feature such as adaptive cruise control. The integer "2" may correspond to an "autonomy level 2" that includes partial automation having at least two advanced driver-assistance systems (ADAS) that can at times control the braking, steering, or acceleration of the autonomous vehicle (such as the autonomous vehicle 110). The integer "3" may correspond to an "autonomy level 3" that includes conditional automation having full control during select parts of a journey based on one or more driving conditions. The integer "4" may correspond to an "autonomy level 4" that includes high automation vehicle in which the autonomous vehicle 110 may be capable of completing an entire journey without driver intervention, but the autonomous vehicle 110 does have some operating constraints. For example, a Level 4 autonomous vehicle may be confined to a certain geographical area (i.e., geofenced), or the Level 4 autonomous vehicle may be prohibited from operating beyond a certain speed. The Level 4 autonomous vehicle may likely still maintain driver controls like a steering wheel and pedals for those instances in which a human may be required to assume control. The integer "5" may correspond to an "autonomy level 5" that includes full automation and does not require driver intervention at all. The Level 5 autonomous vehicle may be capable of complete hands-off, driverless operation under all circumstances.

In an exemplary embodiment, the color-based tagging of a route segment (such as the first route segment) may be executed by tagging (for example, coloring on the digital autonomy map) the route segment using a color such as "red", "purple", "blue", "yellow", "orange", or "green". The color "red" may correspond to an "autonomy level 0". The color "purple" may correspond to an "autonomy level 1". The color "blue" may correspond to an "autonomy level 2". The color "yellow" may correspond to an "autonomy level 3". The color "orange" may correspond to an "autonomy level 4". The color "green" may correspond to an "autonomy level 5".

In an exemplary embodiment, the voice-based tagging of a route segment (such as the first route segment) may be executed by tagging the route segment using a voice command that indicates one of an "autonomy level 0", an "autonomy level 1", an "autonomy level 2", an "autonomy level 3", an "autonomy level 4", or an "autonomy level 5".

Upon generation of the digital autonomy map for the autonomous vehicle 110, the map server 102 may be configured to render a navigation interface on the display of the navigation device 108 of the autonomous vehicle 110 via the communication network 118. The navigation interface may present the digital autonomy map generated for the autonomous vehicle 110. The digital autonomy map may be utilized by the autonomous vehicle 110 for controlling and managing various transit and vehicle dynamics operations between the source location and the destination location. For example, the autonomous vehicle 110 may switch from a first autonomy level associated with a first route segment to a second autonomy level associated with a second route segment, when the autonomous vehicle 110 is making the transition from the first route segment to the second route segment during the trip. In accordance with such switching, the autonomous vehicle 110 may be configured to control and manage various vehicle dynamics such as propulsion, breaking, steering, speed, acceleration, or deacceleration associated with the autonomous vehicle 110.

In an embodiment, the map server 102 may be configured to receive the real-time autonomy levels from the autonomous vehicles 116 that may be currently traversing via the one or more route segments of the first route. Based on the received real-time autonomy levels, the map server 102 may be configured to dynamically update the autonomy level of each route segment of the first route on the digital autonomy map, thereby providing real-time driving assistance to the autonomous vehicle 110. In an embodiment, the autonomy level may be dynamically updated for only those route segments or parts of the route segments of the first route that have not been traversed by the autonomous vehicle 110.

In an embodiment, the map server 102 may be further configured to receive the first sensor data from the autonomous vehicle 110 and the second sensor data from the autonomous vehicles 116. The first sensor data and the second sensor data may include at least the GPS data, the image data, the RADAR data, the ultrasonic data, and the LiDAR data. The map server 102 may be further configured to receive the real-time route information of the first route, the real-time weather information of the first route, and the real-time traffic information of the first route from the database server 106. The real-time route information may include at least a route segment type, speed restriction information, and obstruction information of each route segment of the first route. The real-time traffic information may include real-time traffic conditions associated with each route segment of the first route. The real-time weather information may include at least real-time temperature, fog, light, humidity, and pollution information associated with each route segment of the first route. In an embodiment, the map server 102 may be further configured to dynamically update the autonomy level of each route segment (that has not been traversed by the autonomous vehicle 110) of the first route based on at least one of the first sensor data, the second sensor data, the real-time route information, the real-time traffic information, and the real-time weather information. For example, a current autonomy level of the autonomous vehicle 110 is 5 along a first route segment, and autonomy levels for subsequent route segments are set as 4, 5, and 4. The map server 102 receives the first sensor data from the autonomous vehicle 110 and determines that a LiDAR sensor of the autonomous vehicle 110 is currently not operating. In such a scenario, the map server 102 may downgrade the autonomy level of each route segment of the first route. For example, the current autonomy level along the first route segment may be downgraded from 5 to 4, and the autonomy levels for the subsequent route segments may be downgraded from 4, 5, and 4 to 3, 4, and 3, respectively. In another example, the current autonomy levels set for a first route segment, a second route segment, and a third route segment are 4, 5, and 3, and the autonomous vehicle 110 is currently traversing along the first route segment. The map server 102 receives the second sensor data from the autonomous vehicles 116 and determines an occurrence of an accident along the second route segment based on at least the second sensor data such as the image data of the exterior environment of the second route segment. In such a scenario, the map server 102 may downgrade the autonomy level of the second route segment from 5 to 3. In another example, the current autonomy levels set for a first route segment, a second route segment, and a third route segment are 3, 3, and 3, and the autonomous vehicle 110 is currently traversing along the first route segment. The map server 102 receives the real-time weather information and determines that the second route segment and the third route segment have pleasant weather conditions with a light intensity greater than a minimum threshold value with no fog. Also, route visibility is more than what is required for driving along the second route segment and the third route segment. In such a scenario, the map server 102 may upgrade the autonomy level of the second route segment and the third route segment from 3 and 3 to 5 and 4, respectively.

In an embodiment, the map server 102 may be further configured to dynamically update the autonomy level of each route segment (that has not been traversed by the autonomous vehicle 110) of the first route based on the vehicle category of at least one of the autonomous vehicle 110 and the autonomous vehicles 116. For example, the current autonomy levels set for a first route segment, a second route segment, and a third route segment are 3, 4, and 3, and the autonomous vehicle 110 is currently traversing along the first route segment. The autonomous vehicle 110 is associated with a first vehicle category, for example, a mini hatchback vehicle category. The map server 102 may determine that the autonomous vehicles 116 are currently traversing along the second route segment of the same first route and are ahead of the autonomous vehicle 110. Further, the autonomous vehicles 116 are associated with a second vehicle category, for example, a prime sedan vehicle category. Since the vehicle category of the autonomous vehicle 110 and the autonomous vehicles 116 is different from each other, any change or update with respect to the autonomy level may not be in a proportionate order. For example, if the autonomy level of the autonomous vehicles 116 change from 5 to 4 while traversing along the second route segment, then the autonomy level for the autonomous vehicle 110 along the second route segment may be updated from 4 to 2. Further, in an embodiment, the map server 102 may be configured to dynamically update the autonomy level of each route segment (that has not been traversed by the autonomous vehicle 110) of the first route based on the operating state (i.e., the current working status) of the one or more sensors and processing components of at least one of the autonomous vehicle 110 and the autonomous vehicles 116. For example, the current autonomy levels set for a first route segment, a second route segment, and a third route segment are 3, 4, and 3. Further, the autonomous vehicle 110 has 3 sensors such as a LiDAR sensor, a RADAR sensor, and an image senor. The map server 102 determines that the image sensor is currently not working due to some malfunction. In such a scenario, the map server 102 may downgrade the autonomy levels set for the first route segment, the second route segment, and the third route segment from 3, 4, and 3 to 2, 2, and 2, respectively. Based on the various update of the autonomy levels during the trip, the digital autonomy map may be utilized by the autonomous vehicle 110 and/or the user 112 (such as the driver) for controlling and managing the various transit and vehicle dynamics operations between the source location and the destination location.

In an embodiment, the map server 102 may be further configured to communicate the one or more navigation instructions and commands to the autonomous vehicle 110 and/or the user 112 (such as the driver) to navigate the autonomous vehicle 110 along the one or more route segments of the first route. The one or more navigation instructions and commands may be communicated in the form of text messages, audio signals, video signals, or any combination thereof, and may include point-by-point directions for navigating along the first route. In another embodiment, the transportation server 104 may be configured to provide a driving plan (including one or more driving instructions) to the user 112 of the autonomous vehicle 110 based on the received the real-time route information, the real-time traffic information, and the real-time weather information. The transportation server 104 may be further configured to provide notifications on the navigation device 108 for alerting the autonomous vehicle 110 or the user 112 (such as the driver) of the autonomous vehicle 110 while switching between the route segments.

Figure 2:
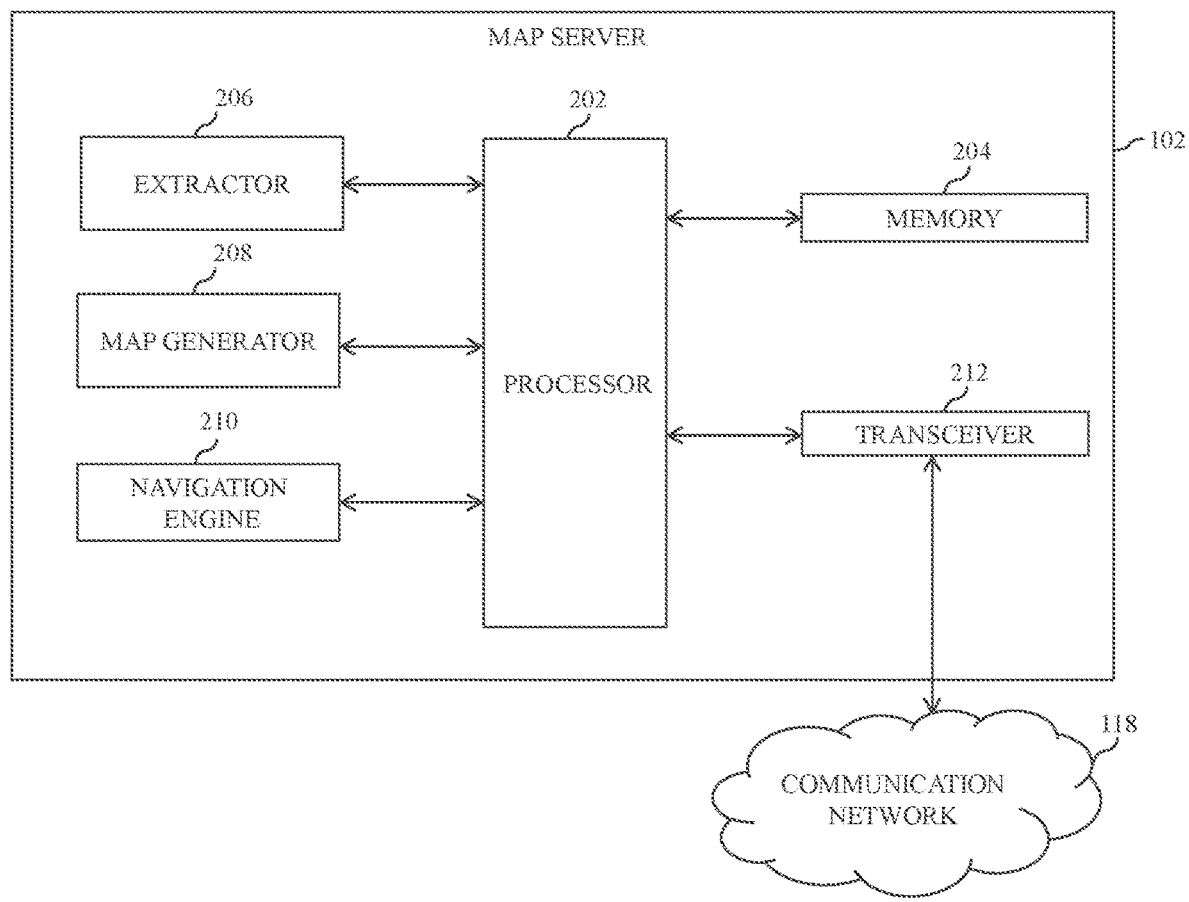
FIG. 2 is a block diagram that illustrates a map server of the environment of FIG. 1, in accordance with an exemplary embodiment of the disclosure.

FIG. 2 is a block diagram that illustrates the map server 102, in accordance with an exemplary embodiment of the disclosure. The map server 102 includes circuitry such as a processor 202, a memory 204, an extractor 206, a map generator 208, a navigation engine 210, and a transceiver 212 that communicate with each other via a first communication bus (not shown).

The processor 202 may include suitable logic, circuitry, interfaces, and/or code, executable by the circuitry, that may be configured to perform one or more operations for generating and rendering the digital autonomy map. Examples of the processor 202 may include, but are not limited to, an application-specific integrated circuit (ASIC) processor, a reduced instruction set computing (RISC) processor, a complex instruction set computing (CISC) processor, and a field-programmable gate array (FPGA). It will be apparent to a person of ordinary skill in the art that the processor 202 may be compatible with multiple operating systems.

In an embodiment, the processor 202 may be configured to retrieve the source location and the destination location of the user 112 from the transportation server 104 or the database server 106 for determining the one or more routes. The processor 202 may be further configured to control and manage various functionalities and operations such as data extraction and map generation. The processor 202 may be further configured to control and manage generation and presentation of real-time navigation instructions and commands for navigating across the one or more route segments of the one or more routes.

In an embodiment, the processor 202 may be further configured to extract the historical autonomy levels from the transportation server 104 or the database server 106. The processor may be further configured to determine the autonomy level of each of the one or more route segments of the one or more routes based on at least the historical autonomy levels associated with the one or more route segments.

In an embodiment, the processor 202 may operate as a master processing unit, and the memory 204, the extractor 206, the map generator 208, and the navigation engine 210 may operate as slave processing units. In such a scenario, the processor 202 may be configured to instruct the memory 204, the extractor 206, the map generator 208, and the navigation engine 210 to perform the corresponding operations either independently or in conjunction with each other.

The memory 204 may include suitable logic, circuitry, interfaces, and/or code, executable by the circuitry, that may be configured to store one or more instructions that are executed by the processor 202, the extractor 206, the map generator 208, and the navigation engine 210 to perform their operations. In an exemplary embodiment, the memory 204 may be configured to temporarily store the historical autonomy levels associated with the one or more route segments of the one or more routes. The memory 204 may be further configured to temporarily store real-time information pertaining to traffic information, weather information, and route information. The memory 204 may be further configured to temporarily store the first sensor data received from the autonomous vehicle 110, and the second sensor data received from the autonomous vehicles 116. The memory 204 may be further configured to temporarily store the vehicle category of the autonomous vehicle 110, the autonomous vehicles 114, and the autonomous vehicles 116. The memory 204 may be further configured to temporarily store the operating state (i.e., the current operating status) of the one or more sensors and processing components associated with the autonomous vehicle 110 or each of the autonomous vehicles 116. The memory 204 may be further configured to temporarily store one or more sets of pre-defined rules and data that can be utilized for updating the autonomy level in real-time. The memory 204 may be further configured to temporarily store the determined autonomy levels of the one or more route segments. Examples of the memory 204 may include, but are not limited to, a random-access memory (RAM), a read-only memory (ROM), a programmable ROM (PROM), and an erasable PROM (EPROM).

The extractor 206 may include suitable logic, circuitry, interfaces, and/or code, executable by the circuitry, that may be configured to perform the one or more operations for data extraction. The extractor 206 may be implemented by one or more processors, such as, but are not limited to, an ASIC processor, a RISC processor, a CISC processor, and an FPGA processor. Further, the extractor 206 may include a machine-learning model that implements any suitable machine-learning techniques, statistical techniques, or probabilistic techniques for performing one or more data extraction operations.

In an exemplary embodiment, the extractor 206 may be configured to extract the historical autonomy levels from the database server 106, and store the extracted historical autonomy levels in the memory 204. The extractor 206 may be further configured to extract the real-time information, such as the traffic information, the route information, the weather information, the first sensor data, and the second sensor data, from the database server 106, and store the real-time information in the memory 204.

The map generator 208 may include suitable logic, circuitry, interfaces, and/or code, executable by the circuitry, that may be configured to perform the one or more operations for generating the digital autonomy map. The map generator 208 may be implemented by one or more processors, such as, but are not limited to, an ASIC processor, a RISC processor, a CISC processor, and an FPGA processor. Further, the map generator 208 may include a machine-learning model that implements any suitable machine-learning techniques, statistical techniques, or probabilistic techniques for performing the one or more operations for generating the digital autonomy map.

In an exemplary embodiment, the map generator 208 may be configured to retrieve the historical autonomy levels from the memory 204. The map generator 208 may be further configured to generate the digital autonomy map such that each route segment on the digital autonomy map is tagged with the determined autonomy level. In an exemplary embodiment, if the source location and the destination location are the same for a plurality of autonomous vehicles, then the digital autonomy map may be the same for the plurality of autonomous vehicles when the vehicle category associated with the plurality of autonomous vehicles is also the same. In another exemplary embodiment, if the source location and the destination location are the same for a plurality of autonomous vehicles and the vehicle category of each of the plurality of autonomous vehicles is different, then the digital autonomy map may be different for each of the plurality of autonomous vehicles. In another exemplary embodiment, if the source location and the destination location are the same for a plurality of autonomous vehicles and the vehicle category of each of the plurality of autonomous vehicles is also the same, then the digital autonomy map may be the same for each of the plurality of autonomous vehicles when the number of sensors and processing components in each of the plurality of autonomous vehicles is also the same and the sensors and processing components are in operating conditions. In another exemplary embodiment, if the source location and the destination location are the same for a plurality of autonomous vehicles and the vehicle category of each of the plurality of autonomous vehicles is also the same, but the number of sensors and processing components in each of the plurality of autonomous vehicles is different, then the digital autonomy map may be different for each of the plurality of autonomous vehicles.

Upon generation of the digital autonomy map for each autonomous vehicle (such as the autonomous vehicle 110), the map generator 208 may be configured to dynamically update the digital autonomy map. For example, the digital autonomy map may be dynamically updated in real-time based on at least one of the real-time traffic information, the real-time route information, the real-time weather information, the first sensor data, the second sensor data, the vehicle category, or the operating states of the one or more sensors and processing components.

The navigation engine 210 may include suitable logic, circuitry, interfaces, and/or code, executable by the circuitry, that may be configured to perform the one or more operations for navigation of the autonomous vehicle 110 along the first route. The navigation engine 210 may be implemented by one or more processors, such as, but are not limited to, an ASIC processor, a RISC processor, a CISC processor, and an FPGA processor. Further, the navigation engine 210 may include a machine-learning model that implements any suitable machine-learning techniques, statistical techniques, or probabilistic techniques for performing the one or more operations.

In an exemplary embodiment, the navigation engine 210 may be configured to render the one or more navigation interfaces on the display of the navigation device 108 based on the navigation request. A navigation interface may be a graphical user interface (GUI) that allows an entity (such as the autonomous vehicle 110 or the user 112) to interact with the map server 102 by utilizing information and options (e.g., graphical icons and visual indicators) included in the GUI. In an exemplary embodiment, the navigation engine 210 may be further configured to communicate the one or more navigation instructions and commands to the autonomous vehicle 110 and/or the user 112 (such as the driver) for facilitating navigation across the one or more route segments of the first route. The navigation instructions may include road-by-road directions, and/or turn-by-turn directions for navigation of the autonomous vehicle 110 along the first route.

The transceiver 212 may include suitable logic, circuitry, interfaces, and/or code, executable by the circuitry, that may be configured to transmit (or receive) data to (or from) various servers or devices, such as the transportation server 104, the database server 106, or the navigation device 108. Examples of the transceiver 212 may include, but are not limited to, an antenna, a radio frequency transceiver, a wireless transceiver, and a Bluetooth transceiver. The transceiver 212 may be configured to communicate with the transportation server 104, the database server 106, or the navigation device 108 using various wired and wireless communication protocols, such as TCP/IP, UDP, LTE communication protocols, or any combination thereof.

Figure 3:
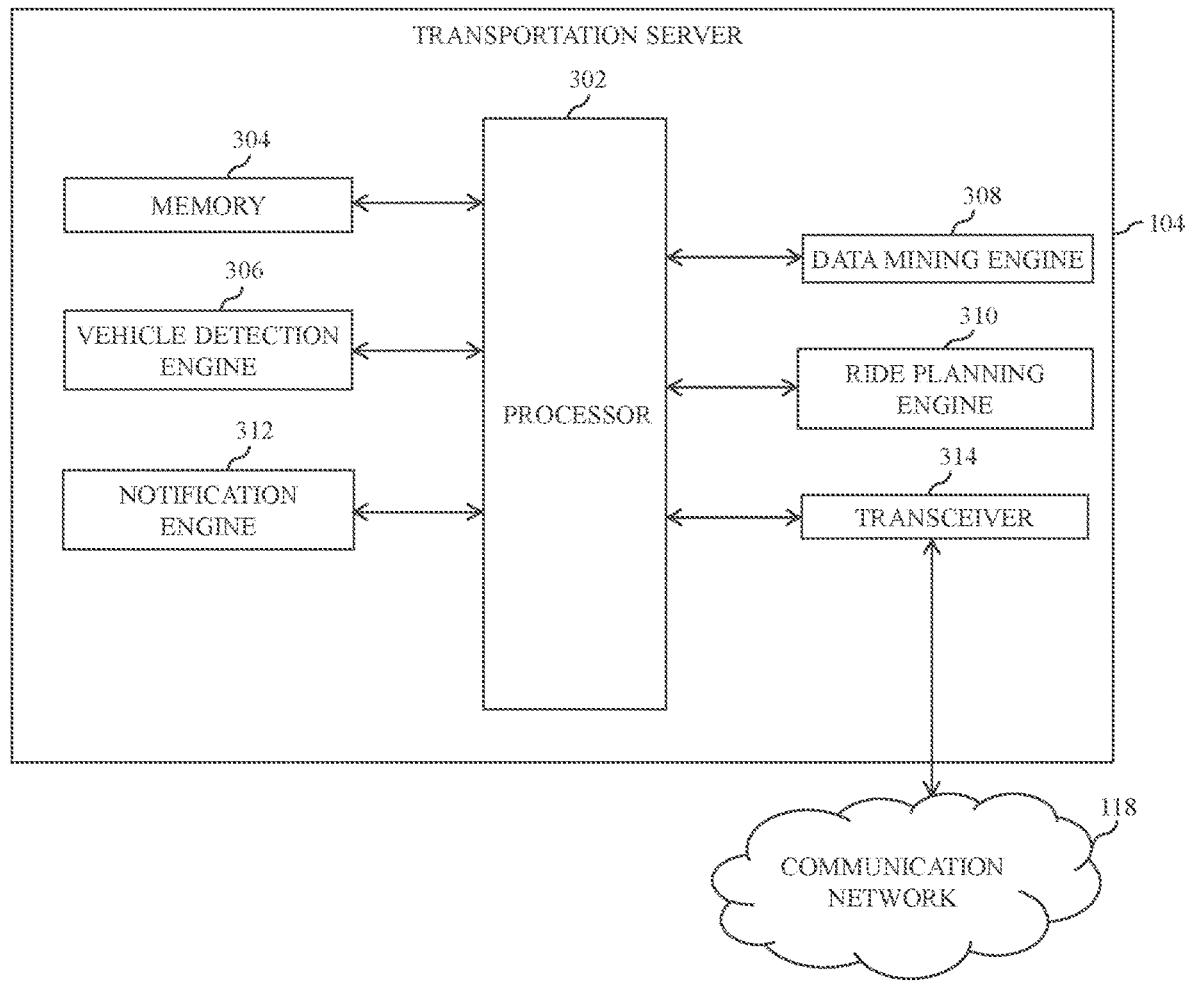
FIG. 3 is a block diagram that illustrates a transportation server of the environment of FIG. 1, in accordance with an exemplary embodiment of the disclosure.

FIG. 3 is a block diagram that illustrates the transportation server 104, in accordance with an exemplary embodiment of the disclosure. The transportation server 104 includes a processor 302, a memory 304, a vehicle detection engine 306, a data mining engine 308, a ride planning engine 310, a notification engine 312, and a transceiver 314 that communicate with each other via a second communication bus (not shown).

The processor 302 may include suitable logic, circuitry, interfaces, and/or code, executable by the circuitry, that may be configured to perform one or more operations. Examples of the processor 302 may include, but are not limited to an ASIC processor, a RISC processor, a CISC processor, and an FPGA. It will be apparent to a person of ordinary skill in the art that the processor 302 is compatible with multiple operating systems.

In an exemplary embodiment, the vehicle detection engine 306 may configure the processor 302 to control and manage detection of an autonomous vehicle (such as the autonomous vehicle 110) for allocation. Further, the data mining engine 308 may configure the processor 302 to control and manage extraction of requisite information from the database server 106. In an exemplary embodiment, the processor 302 may be configured to communicate the driving plan to the user 112 of the autonomous vehicle 110 based on the extracted route information by using the ride planning engine 310. The processor 302 may be further configured to control and manage rendering of the one or more navigation interfaces on the navigation device 108 of the autonomous vehicle 110 by utilizing the notification engine 312. The processor may also communicate one or more notifications, instructions, or commands to the navigation device 108 of the autonomous vehicle 110. In an embodiment, the processor 302 may be configured to generate the historical autonomy levels based on the historical configuration of the one or more sensors and processing components of the autonomous vehicles 114 and the historical weather information associated with the one or more route segments.

In an embodiment, the processor 302 may operate as a master processing unit, the memory 304, the vehicle detection engine 306, the data mining engine 308, the ride planning engine 310, and the notification engine 312, may operate as slave processing units. In such a scenario, the processor 302 may provide instructions to the memory 304, the vehicle detection engine 306, the data mining engine 308, the ride planning engine 310, and the notification engine 312 to perform the one or more operations either independently or in conjunction with each other.

The memory 304 may include suitable logic, circuitry, interfaces, and/or code, executable by the circuitry, that may be configured to store one or more instructions that are executed by the processor 302, the vehicle detection engine 306, the data mining engine 308, the ride planning engine 310, and the notification engine 312 to perform their operations. In an exemplary embodiment, the memory 304 may be configured to temporarily store and manage the information pertaining to the various factors associated with one or more route segments, such as the historical and real-time traffic information, the historical and real-time weather information, or the historical and real-time autonomy information. In an exemplary embodiment, the memory 304 may be further configured to temporarily store the booking request and navigation request initiated by the user 112. In an exemplary embodiment, the memory 304 may be further configured to manage and store real-time allocation status information and allocation information of the various autonomous vehicles. Examples of the memory 304 may include, but are not limited to, a RAM, a ROM, a PROM, and an EPROM.

The vehicle detection engine 306 may include suitable logic, circuitry, interfaces, and/or code, executable by the circuitry, that may be configured to perform the one or more operations for detection of an autonomous vehicle, such as autonomous vehicle 110, for allocation to the user 112. For example, the autonomous vehicle 110 may be detected from one or more autonomous vehicles based on the real-time allocation status information and the real-time position information of the autonomous vehicle 110 obtained from the vehicle device (not shown) of the autonomous vehicle 110. The allocation status information of each autonomous vehicle (such as the autonomous vehicle 110) may indicate whether each autonomous vehicle is available for new allocation or not corresponding to a new booking request. The real-time position information may include GPS information that indicate the current location of the autonomous vehicle 110. The vehicle detection engine 306 may be implemented by one or more processors, such as, but are not limited to, an ASIC processor, a RISC processor, a CISC processor, and an FPGA.

The data mining engine 308 may include suitable logic, circuitry, interfaces, and/or code, executable by the circuitry, that may be configured to perform the one or more operations for data management. For example, the data mining engine 308 may be configured to extract historical information pertaining to the one or more routes, such as historical route information, historical traffic information, historical autonomy information, and historical weather information, from the database server 106, and store the extracted historical information in the memory 304. The data mining engine 308 may be further configured to extract the real-time allocation status information and the real-time position information from a vehicle device (not shown) of the autonomous vehicle 110, and store the real-time allocation status information and the real-time position information in the memory 304. The data mining engine 308 may be implemented by one or more processors, such as, but not limited to, an ASIC processor, a RISC processor, a CISC processor, and an FPGA.

The ride planning engine 310 may include suitable logic, circuitry, interfaces, and/or code, executable by the circuitry, that may be configured to perform the one or more operations for communicating the driving plan including the one or more driving instructions to the autonomous vehicle 110. For example, the ride planning engine 310 may provide the one or more driving instructions for maintaining user and vehicle safety and mitigating worst-case travel scenarios, such as vehicle collision, vehicle skidding, or the like. The one or more driving instructions are based on factors such as conditions of the route to be traversed by the autonomous vehicle 110, the type of the road (i.e., backroad, carriageway, highway, or the like) included in the route, the current location of the autonomous vehicle 110, the time of travel, the weather condition at the time of travel, or the like. In an embodiment, the ride planning engine 310 may suggest an optimal route (such as the first route) to be followed by the autonomous vehicle 110 from the one or more routes based on the overall autonomy level of each route, the real-time traffic conditions of each route, the real-time environmental conditions of each route, the trip time associated with each route, or the route preferences of the user 112 associated with the autonomous vehicle 110. The ride planning engine 310 may be realized by utilizing one or more mathematical models, statistical models, and/or algorithms. The ride planning engine 310 may be implemented by one or more processors, such as, but are not limited to, an ASIC processor, a RISC processor, a CISC processor, and an FPGA.

The notification engine 312 may include suitable logic, circuitry, interfaces, and/or code, executable by the circuitry, that may be configured to perform one or more notification operations. For example, the notification engine 312 may present the one or more notifications, instructions, or commands on the navigation device 108 for assisting the user 112 to drive the autonomous vehicle 110. The notification engine 312 may communicate the one or more notifications, instructions, or commands to the navigation device 108 for alerting the user 112 to a potential change in vehicle settings of the autonomous vehicle 110 corresponding to the change in autonomy level of the route segment while switching between the route segments. The notification engine 312 may be implemented by one or more processors, such as, but not limited to, an ASIC processor, a RISC processor, a CISC processor, and an FPGA.

The transceiver 314 may include suitable logic, circuitry, interfaces, and/or code, executable by the circuitry, that may be configured to transmit (or receive) data to (or from) various servers or devices, such as the map server 102, the database server 106, or the navigation device 108. Examples of the transceiver 314 may include, but are not limited to, an antenna, a radio frequency transceiver, a wireless transceiver, and a Bluetooth transceiver. The transceiver 314 may be configured to communicate with the map server 102, the database server 106, or the navigation device 108 using various wired and wireless communication protocols, such as TCP/IP, UDP, LTE communication protocols, or any combination thereof.

Figure 4:
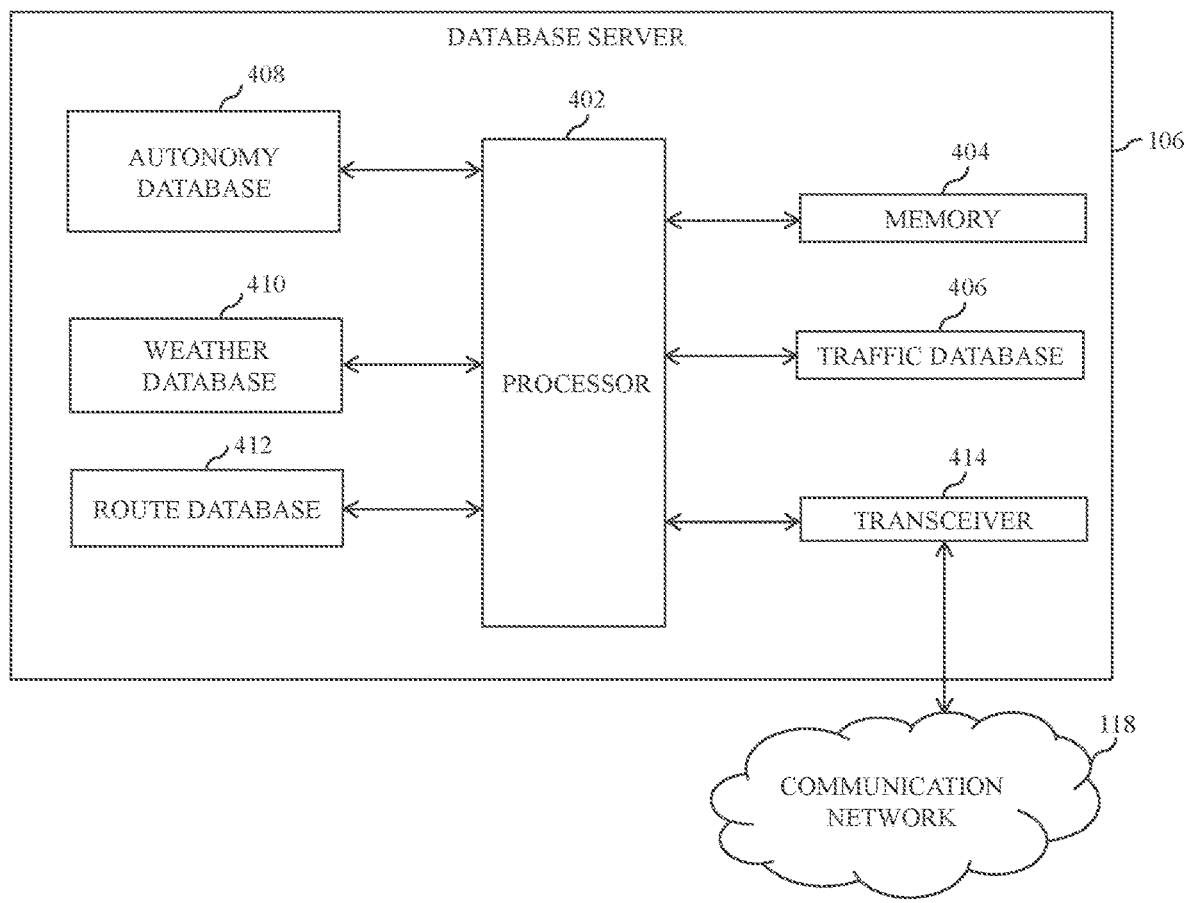
FIG. 4 is a block diagram that illustrates a database server of the environment of FIG. 1, in accordance with an exemplary embodiment of the disclosure.

FIG. 4 is a block diagram that illustrates the database server 106, in accordance with an exemplary embodiment of the disclosure. The database server 106 includes circuitry such as a processor 402, a memory 404, a traffic database 406, an autonomy database 408, a weather database 410, a route database 412, and a transceiver 414 that communicate with each other via a third communication bus (not shown).

The processor 402 may include suitable logic, circuitry, interfaces, and/or code, executable by the circuitry, that may be configured to perform one or more operations to store information pertaining to multiple factors. Examples of the processor 402 may include, but are not limited to an ASIC processor, a RISC processor, a CISC processor, and an FPGA. It will be apparent to a person of ordinary skill in the art that the processor 402 is compatible with multiple operating systems.

In an exemplary embodiment, the processor 402 may be configured to control and manage extraction of requisite traffic information from a third-party traffic server, and store the traffic information in the traffic database 406. The processor 402 may further control and manage extraction of requisite autonomy information from one or more autonomous vehicles (such as the autonomous vehicle 110, the autonomous vehicles 114, and the autonomous vehicles 116), and store the autonomy information in the autonomy database 408. The processor 402 may further control and manage extraction of requisite weather information from a third-party weather server, and store the weather information in the weather database 410. The processor 402 may further control and manage extraction of requisite route information associated with the one or more routes from a third-party route server, and store the route information in the route database 412.

The memory 404 may include suitable logic, circuitry, interfaces, and/or code, executable by the circuitry, that may be configured to store one or more instructions that are executed by the processor 402 to extract requisite information from the third-party traffic server, the one or more autonomous vehicles, the third-party weather server, or the third-party route server. Examples of the memory 404 may include, but are not limited to, a RAM, a ROM, a PROM, and an EPROM.

The traffic database 406 may include suitable logic, circuitry, interfaces, and/or code, executable by the circuitry, that may be configured to perform one or more database operations. For example, the traffic database 406 may be configured to manage and store local traffic data associated with the one or more route segments of the one or more routes of a geographical region. The local traffic data may include real-time traffic flow conditions associated with the one or more route segments of the one or more routes. For example, the local traffic data may include traffic congestion-related information associated with each route segment. The traffic database 406 may further manage and store information related to one or more temporal events (such as sporting events, parades, and the like) that may cause significant impact upon the traffic flow conditions. The traffic database 406 may also manage and store the obstruction information associated with each route segment of the one or more routes. The obstruction information may include information associated with road blockages, accidents, potholes, or the like.

The autonomy database 408 may include suitable logic, circuitry, interfaces, and/or code, executable by the circuitry, that may be configured to perform one or more database operations. For example, the autonomy database 408 may be configured to manage and store the autonomy information pertaining to the one or more routes, such as the historical autonomy levels associated with the one or more route segments of the one or more routes. In an embodiment, the autonomy database 408 may include a tabular data structure including one or more rows and columns for storing the autonomy level information in a structured manner. For example, each row may be associated with a time or a time duration of a day, and the one or more columns may correspond to the number of autonomous vehicles along each route segment, the autonomy level of each autonomous vehicle, the autonomy level of each route segment based on the autonomy level of each autonomous vehicle, or the like. In an embodiment, the autonomy database 408 may manage and store the real-time autonomy levels of the one or more autonomous vehicles such as the autonomous vehicles 116.

The weather database 410 may include suitable logic, circuitry, interfaces, and/or code, executable by the circuitry, that may be configured to perform one or more database operations. For example, the weather database 410 may be configured to manage and store the weather information associated with the one or more route segments of the one or more routes. The weather information may include actual measured weather variables in a local geographical region such as temperature, fog, light, humidity, or pollution levels associated with the one or more route segments. The weather database 410 may store weather forecast-related information that may significantly affect the traffic flow along the one or more route segments of the one or more routes.

The route database 412 may include suitable logic, circuitry, interfaces, and/or code, executable by the circuitry, that may be configured to perform one or more database operations. For example, the route database 412 may manage and store route information associated with the one or more route segments of the one or more routes. The route information may include at least one of a road name of each road associated with each route segment, a road type of each road included in the route, speed restrictions associated with each route segment, or the obstruction information associated with each route segment. The route information may also include information associated with at least one of the shopping malls, the fuel centers, promotional events, and the tourist spots along the one or more route segments of each route.

The transceiver 414 may include suitable logic, circuitry, interfaces, and/or code, executable by the circuitry, that may be configured to transmit (or receive) data to (or from) various servers or devices, such as the map server 102, the transportation server 104, or the navigation device 108. Examples of the transceiver 414 may include, but are not limited to, an antenna, a radio frequency transceiver, a wireless transceiver, and a Bluetooth transceiver. The transceiver 414 may be configured to communicate with the map server 102, the transportation server 104, or the navigation device 108 using various wired and wireless communication protocols, such as TCP/IP, UDP, LTE communication protocols, or any combination thereof.

Figure 5A:
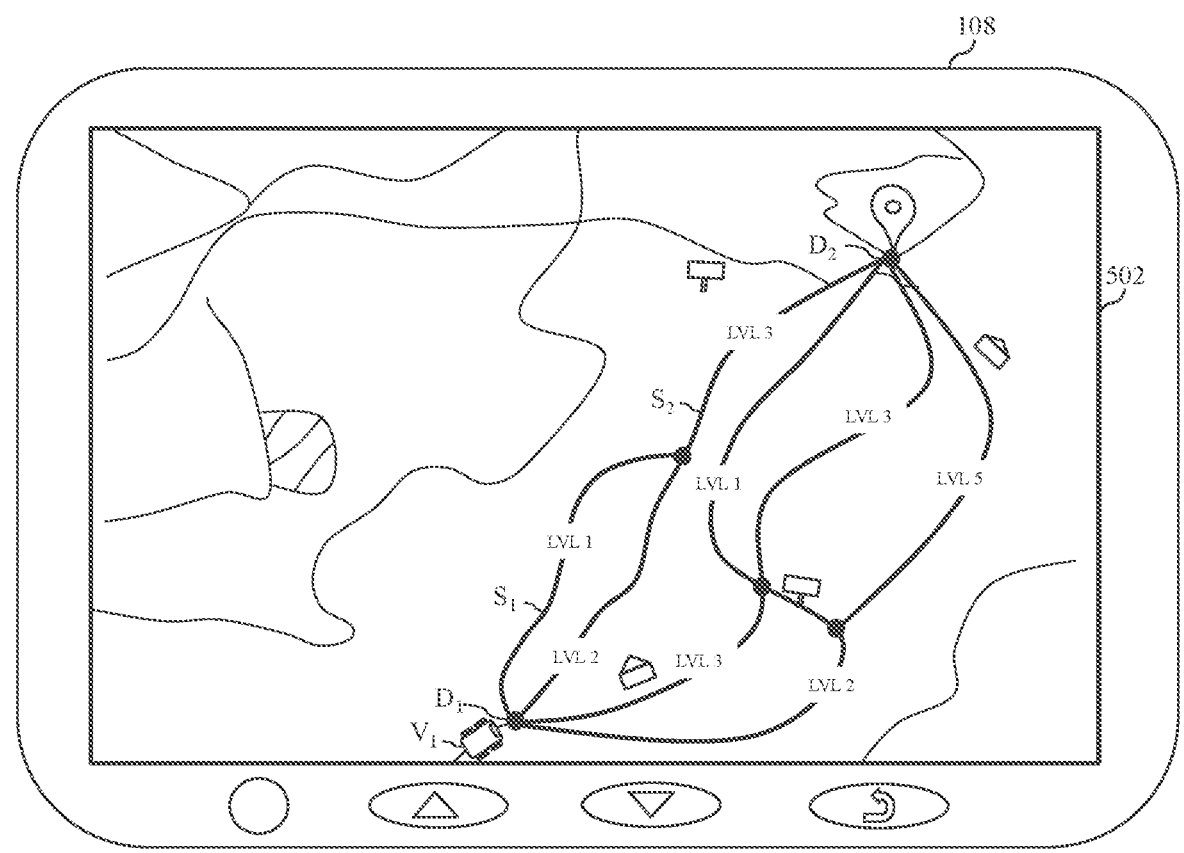
FIGS. 5A and 5B are diagrams that collectively illustrate the digital autonomy map rendered on a navigation device of an autonomous vehicle of the environment of FIG. 1, in accordance with an exemplary embodiment of the disclosure.
Figure 5B:
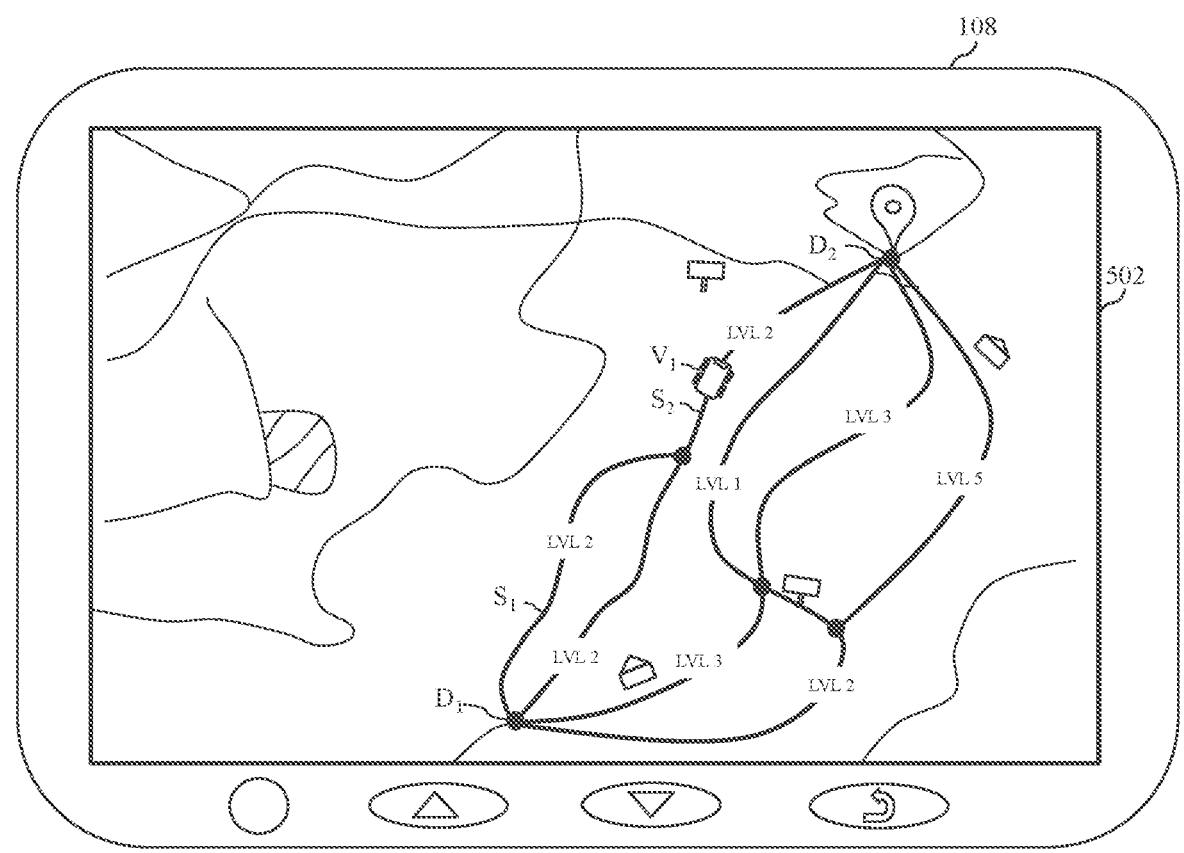

FIGS. 5A and 5B are diagrams that collectively illustrate the digital autonomy map rendered on the navigation device 108 of the autonomous vehicle 110, in accordance with an exemplary embodiment of the disclosure. The map server 102 may be configured to render a user interface 502 on the display of the navigation device 108 based on the navigation request. The user interface 502 may present the digital autonomy map generated based on the navigation request. The digital autonomy map may include the one or more route segments of at least the first route connecting the source location and the destination location. Further, each route segment on the digital autonomy map may be tagged with the autonomy level that has been determined based on the extracted historical autonomy levels. The historical autonomy levels are generated, by the transportation server 104 prior to the extraction, based on the historical weather information and the historical configuration of the one or more sensors and processing components of the autonomous vehicles 114. The digital autonomy map presented on the user interface 502 may be further updated in real-time based on at least one of the first sensor data, the second sensor data, the real-time route information, the real-time weather information, and the real-time traffic information.

In an exemplary scenario, the user interface 502 may present a digital autonomy map of a geographical region as shown in FIG. 5A. The digital autonomy map may correspond to a satellite image of the geographical region including the one or more route segments (such as segments $S_1$ and $S_2$) of the one or more routes. Each of the one or more route segments of the one or more routes are tagged with an autonomy level by the map server 102 based on at least the historical autonomy levels associated with each route segment. For example, the segment $S_1$ is tagged with an autonomy level "1" (i.e., LVL 1 as shown in FIG. 5A) and the segment $S_2$ is tagged with an autonomy level "3" (i.e., LVL 3 as shown in FIG. 5A). One or more autonomous vehicles (such as the autonomous vehicle 110) may utilize the digital autonomy map to traverse from one location to another location via the one or more route segments. When the one or more autonomous vehicles are traversing along the one or more route segments, the autonomy level of each route segment may be dynamically updated based on at least one of the sensor data (such as the first sensor data and the second sensor data) of the one or more autonomous vehicles, the real-time traffic information, the real-time route information, and the real-time weather information associated with each route. For example, an autonomous vehicle $V_1$ is traversing from a source location $D_1$ to a destination location $D_2$ via the segments $S_1$ and $S_2$ as shown in FIG. 5A. When the autonomous vehicle $V_1$ is traversing along the segment $S_2$, the map server 102 updates the digital autonomy map by updating at least the autonomy level of the segment $S_2$ in real-time from level "3" (i.e., LVL 3 as shown in FIG. 5A) to level "2" (i.e., LVL 2 as shown in FIG. 5B). The updated digital autonomy map may be utilized by a driver (such as the user 112) or the autonomous vehicle $V_1$ (such as the autonomous vehicle 110) for controlling and managing the various transit and vehicle dynamics operations along the segment $S_2$ to reach the destination location $D_2$.

Figure 6A:
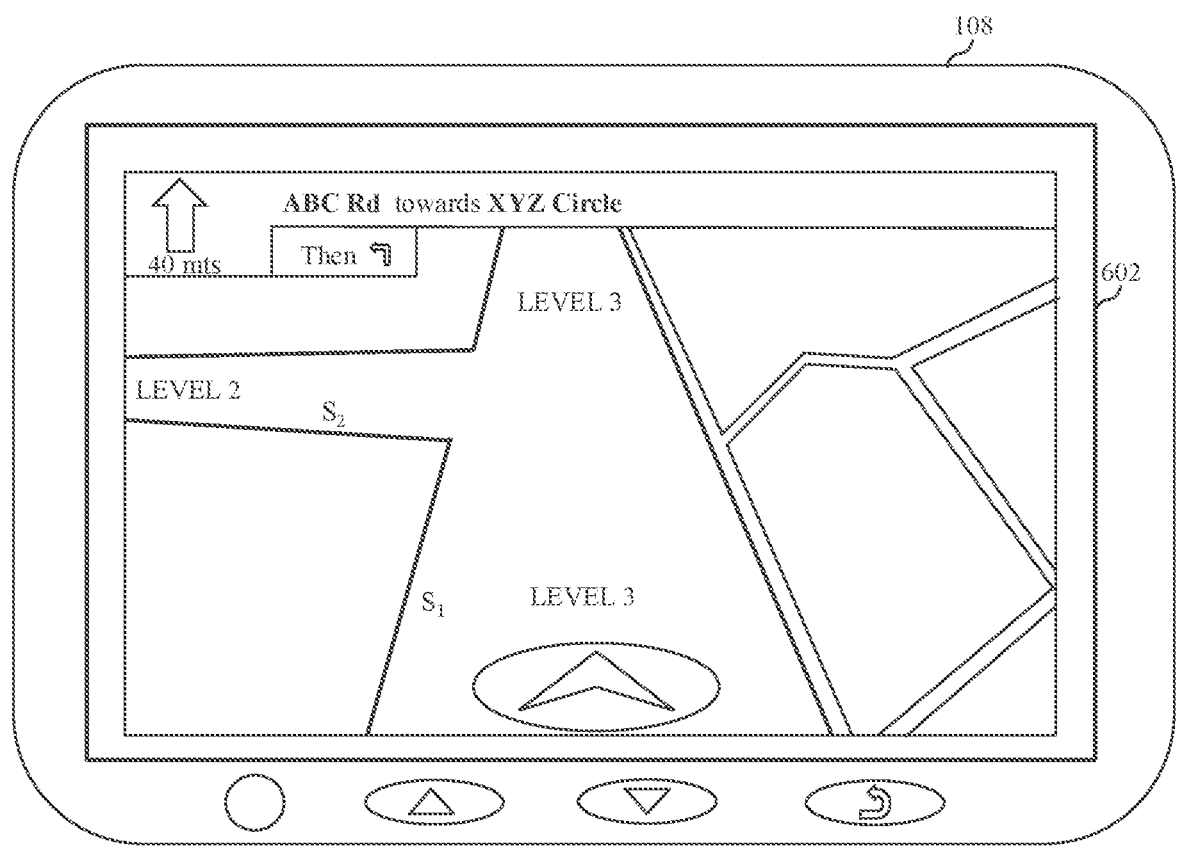
FIGS. 6A and 6B are diagrams that collectively illustrate a navigation interface rendered on the navigation device, in accordance with an exemplary embodiment of the disclosure.
Figure 6B:
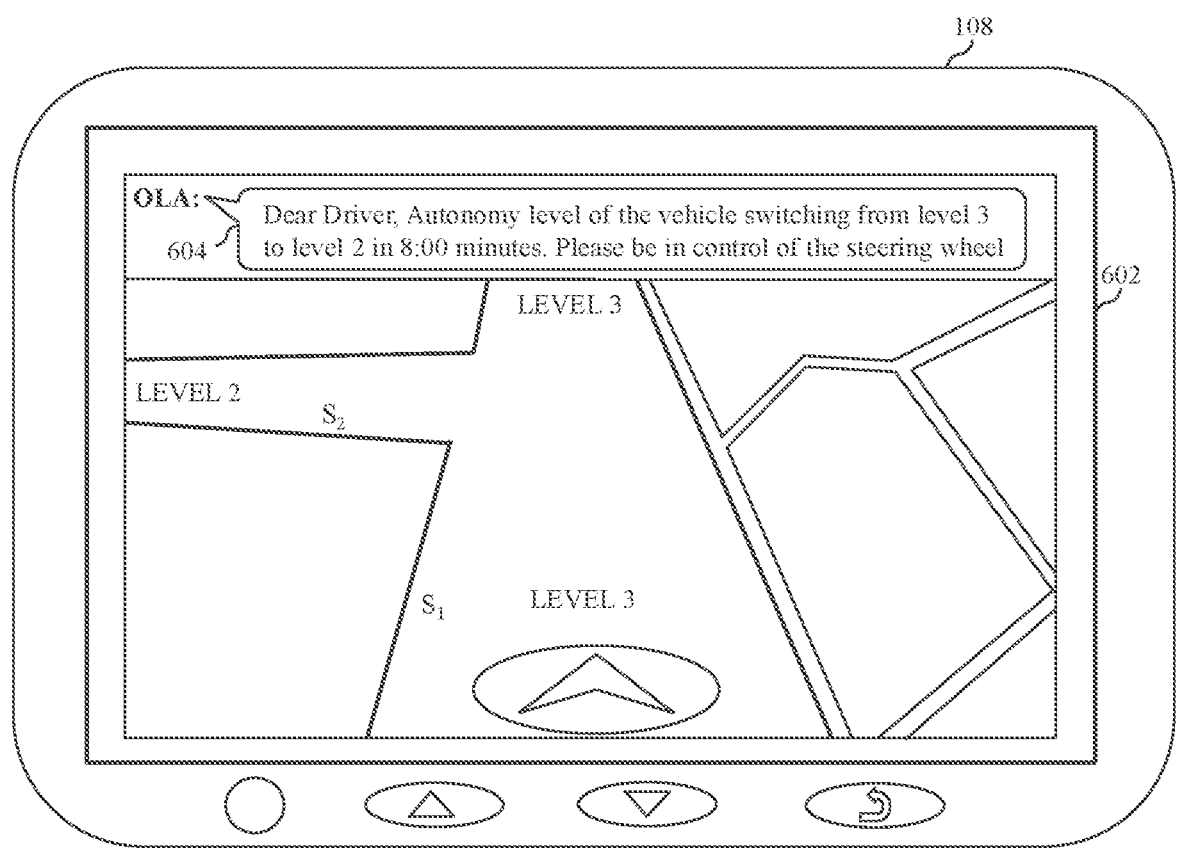

FIGS. 6A and 6B are diagrams that collectively illustrate a navigation interface 602 rendered on the navigation device 108, in accordance with an exemplary embodiment of the disclosure. The map server 102 may be configured to render the navigation interface 602 on the display of the navigation device 108 of the autonomous vehicle 110, when the navigation device 108 is used for navigating from the source location to the destination location.

As shown in FIG. 6A, the navigation engine 210 renders the navigation interface 602 on the display of the navigation device 108 for facilitating the navigation of the autonomous vehicle 110 along the one or more route segments of the first route. The navigation interface 602 may present a satellite image of the geographical region including the one or more route segments of at least the first route that is connecting the source location with the destination location. Each route segment is tagged with the determined autonomy level. The navigation interface 602 may further present the one or more navigation instructions and commands rendered by the navigation engine 210 for providing the real-time driving assistance to the autonomous vehicle 110. The one or more navigation instructions and commands may include road-by-road directions, and/or turn-by-turn directions for navigating along the first route. The navigation interface 602 may further present the route information associated with the one or more route segments of the first route. The route information may include at least one of the road name of each road associated with each route segment, the road type of each road included in the first route, the speed restrictions associated with each route segment, or the obstruction information associated with each route segment.

As shown in FIG. 6B, the navigation interface 602 may present the one or more notifications, instructions, or commands that are rendered on the navigation interface 602 (or a separate notification interface) during the ride. In one example, the navigation engine 210 may render the one or more notifications, instructions, or commands. In another example, the notification engine 312 may render the one or more notifications, instructions, or commands. For example, as shown in FIG. 6B, the notification engine 312 renders a first notification 604 on the navigation interface 602. The first notification 604 may be rendered when the autonomous vehicle 110 is nearing a route segment switching from one route segment (such as a segment $S_1$ having an autonomy level "3") to another route segment (such as a segment $S_2$ having an autonomy level "2"). The first notification 604 may include the autonomy level of the approaching route segment (such as the segment $S_2$) and one or more instructions or commands to assist the autonomous vehicle 110 or the user 112 during the route segment switching based on the autonomy level of the approaching route segment. The navigation interface 602 may further present an estimated time duration and/or distance associated with the route segment switching. In an exemplary scenario, the first notification 604 may be displayed as "Dear Driver, Autonomy level of the vehicle switching from level 3 to level 2 in 8:00 minutes. Please be in control of the steering wheel", as shown in FIG. 6B.

Figure 7A:
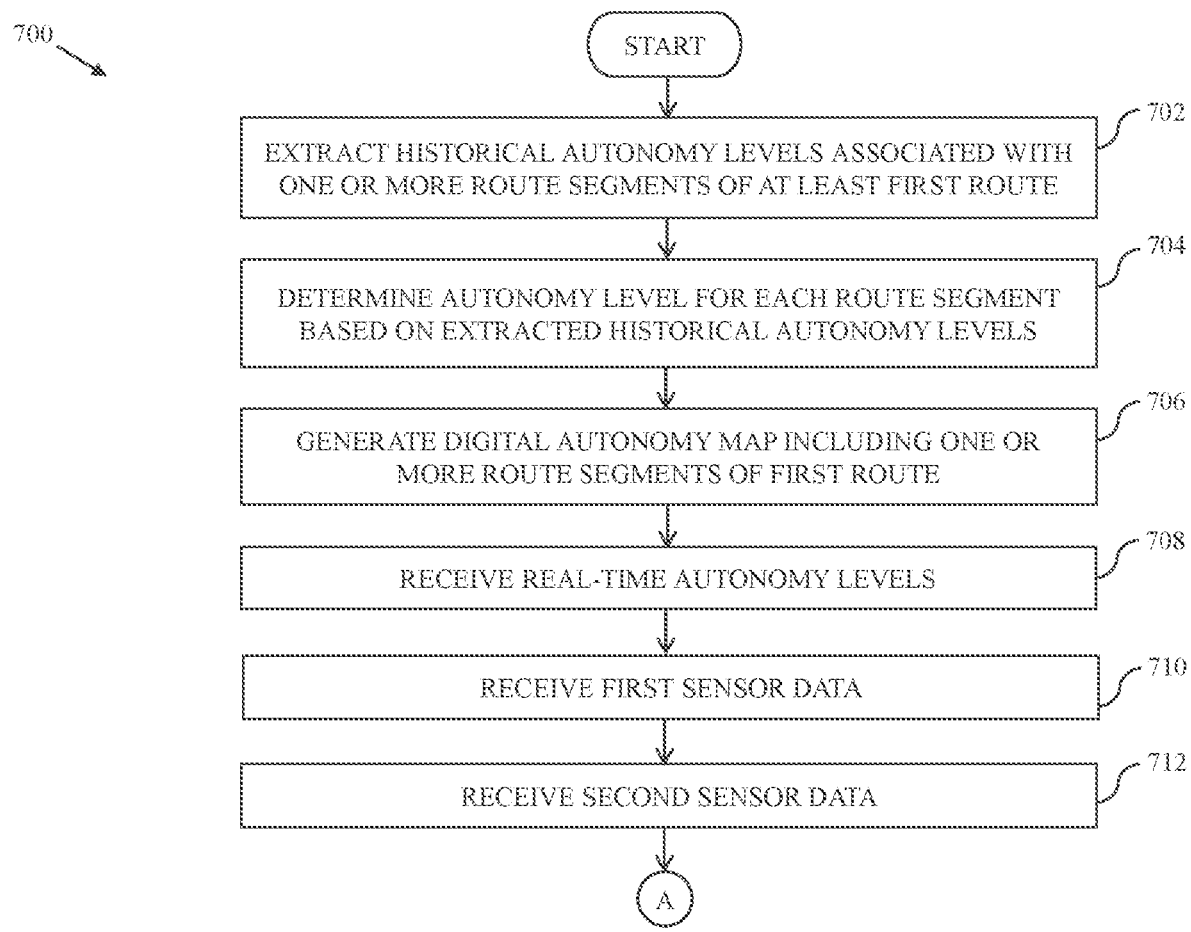
FIGS. 7A and 7B, collectively, illustrate a flow chart of a method for generating a digital autonomy map for providing driving assistance to the autonomous vehicle, in accordance with an exemplary embodiment of the disclosure.
Figure 7B:
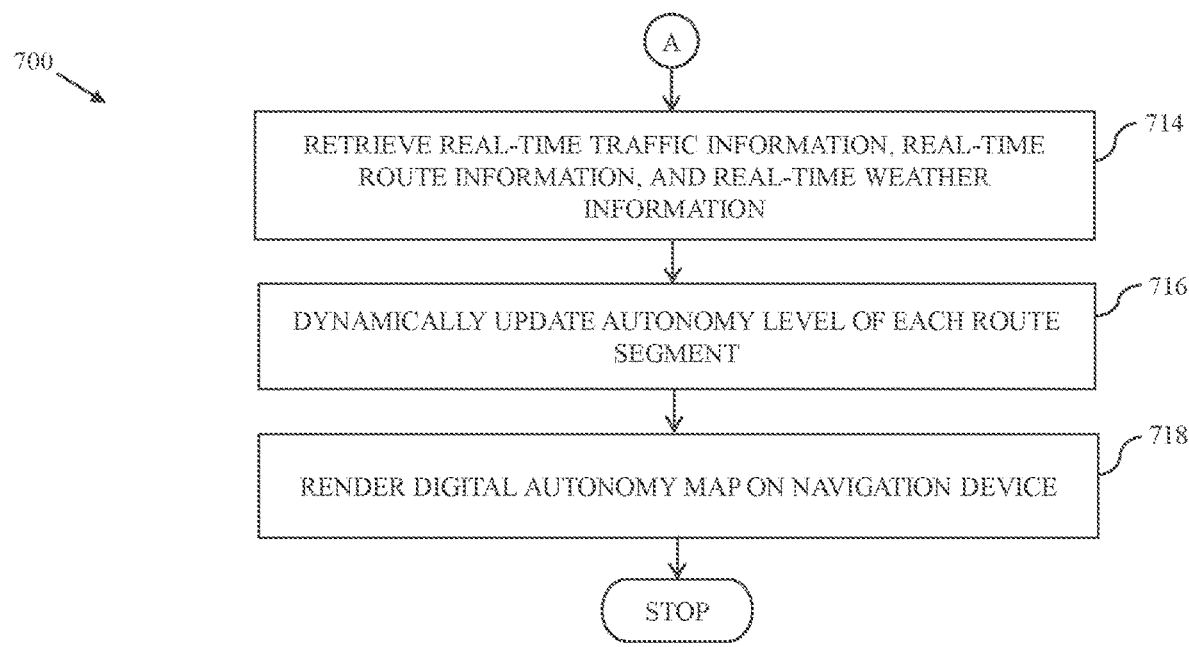

FIGS. 7A and 7B, collectively, illustrate a flow chart 700 of a method for generating the digital autonomy map for providing driving assistance to the autonomous vehicle 110, in accordance with an exemplary embodiment of the disclosure.

At 702, the historical autonomy levels associated with the one or more route segments of at least the first route are extracted. In an embodiment, the map server 102 may be configured to extract the historical autonomy levels from the autonomy database 408. The historical autonomy levels may be extracted based on at least one of the time or the time duration of the day associated with the autonomous vehicle 110. Prior to the extracting of the historical autonomy levels, the historical autonomy levels may be generated, by the transportation server 104, based on at least the historical configuration of the one or more sensors and processing components of the autonomous vehicles 114 and the historical weather information associated with the one or more route segments of the first route. The historical autonomy levels may be further generated based on the historical driving conditions of the one or more route segments of the first route.

At 704, the autonomy level for each route segment is determined based on the extracted historical autonomy levels. In an embodiment, the map server 102 may be configured to determine the autonomy level for each route segment.

At 706, the digital autonomy map including the one or more route segments of the first route is generated. In an embodiment, the map server 102 may be configured to generate the digital autonomy map. Each route segment on the digital autonomy map may be tagged with the respective determined autonomy level. The digital autonomy map may be utilized by the autonomous vehicle 110 for controlling and managing the transit operations between the source location and the destination location. In one example, the digital autonomy map may be different for different categories of autonomous vehicles and/or different configuration of the sensors and processing components. In another example, the digital autonomy map may be the same for the same categories of autonomous vehicles and/or the same configuration of the sensors and processing components.

At 708, the real-time autonomy levels are received. In an embodiment, the map server 102 may be configured to receive the real-time autonomy levels from the autonomous vehicles 116. The autonomous vehicles 116 may be currently traversing the one or more route segments of the first route. Further, the autonomous vehicles 116 may be traversing ahead of the autonomous vehicle 110.

At 710, the first sensor data is received. In an embodiment, the map server 102 may be configured to receive the first sensor data from the autonomous vehicle 110. The first sensor data may include at least one of the GPS data, the image data of the exterior environment, the RADAR data, the ultrasonic data, and the LiDAR data associated with the autonomous vehicle 110.

At 712, the second sensor data is received. In an embodiment, the map server 102 may be configured to receive the second sensor data from the autonomous vehicles 116. The second sensor data may include at least one of the GPS data, the image data of the exterior environment, the RADAR data, the ultrasonic data, and the LiDAR data associated with the autonomous vehicles 116.

At 714, the real-time traffic information, the real-time route information, and the real-time weather information are retrieved. In an embodiment, the map server 102 may be configured to retrieve the real-time traffic information, the real-time route information, and the real-time weather information from the database server 106. For example, the map server 102 may retrieve the real-time traffic information of the first route from the traffic database 406, the real-time weather information of the first route from the weather database 410, and the real-time route information of the first route from the route database 412. The real-time route information may include at least the route segment type, the speed restriction information, and the obstruction information of each route segment. The real-time traffic information may include the real-time traffic conditions associated with each route segment. The real-time weather information may include at least the real-time temperature, fog, light, humidity, and pollution information associated with each route segment.

At 716, the autonomy level of each route segment is dynamically updated. In an embodiment, the map server 102 may be configured to dynamically update the autonomy level of each route segment of the first route. The autonomy level of each route segment may be dynamically updated based on at least one of the real-time autonomy levels, the first sensor data, the second sensor data, the real-time traffic information, the real-time route information, and the real-time weather information. The autonomy level of each route segment may be further updated based on the vehicle category of at least one of the autonomous vehicle 110 and the autonomous vehicles 116. The autonomy level of each route segment may be further updated based on the operating state of the one or more sensors and processing components of at least one of the autonomous vehicle 110 and the autonomous vehicles 116.

At 718, the digital autonomy map is rendered on the navigation device 108. In an embodiment, the map server 102 may be configured to render the digital autonomy map (such as the first time generated digital autonomy map or the updated digital autonomy map) on the navigation device 108 of the autonomous vehicle 110. The transit operations of the autonomous vehicle 110 between the source location and the destination location may be controlled and managed based on at least the navigation and autonomy information indicated by the rendered digital autonomy map.

Figure 8:
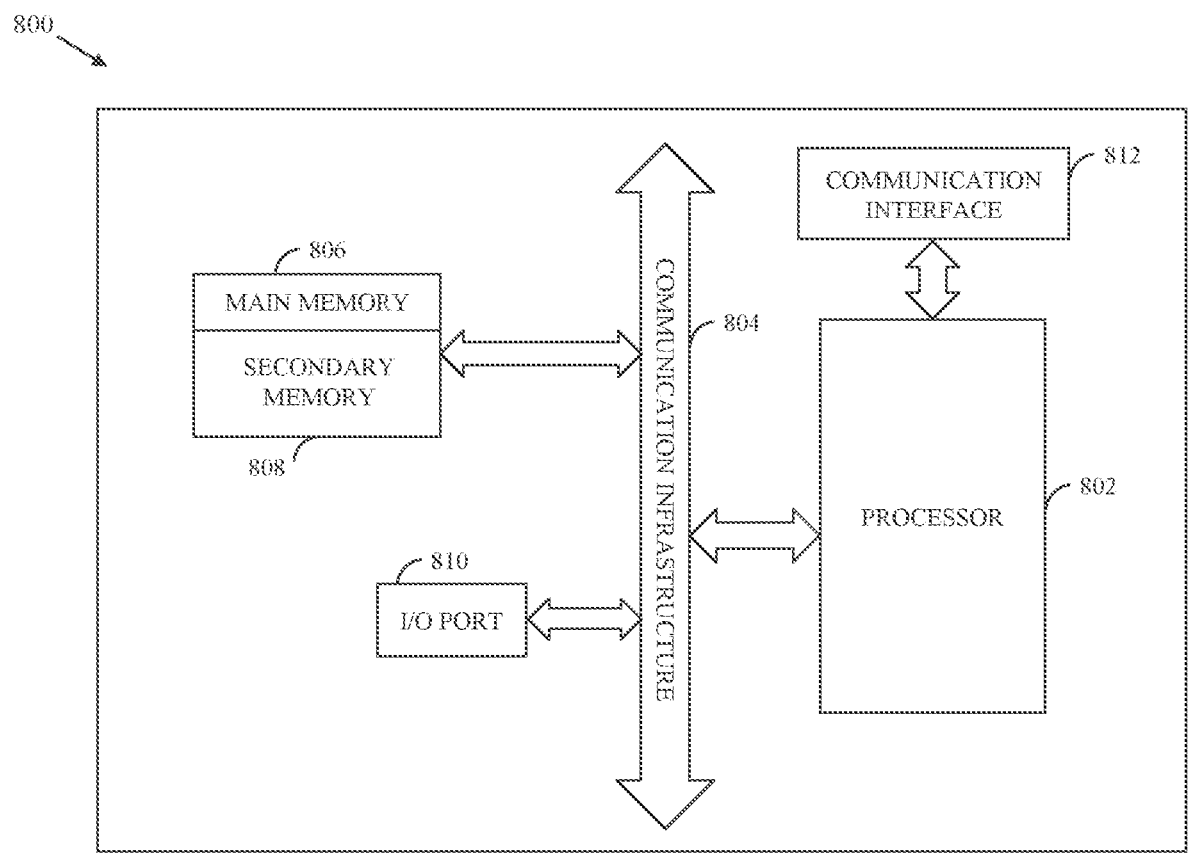
FIG. 8 is a block diagram that illustrates a system architecture of a computer system for generating the digital autonomy map for the autonomous vehicle for providing real-time driving assistance to the autonomous vehicle, in accordance with an exemplary embodiment of the disclosure.

FIG. 8 is a block diagram that illustrates a system architecture of a computer system 800 for generating the digital autonomy map for the autonomous vehicle 110 for providing the real-time driving assistance to the autonomous vehicle 110, in accordance with an exemplary embodiment of the disclosure. An embodiment of the disclosure, or portions thereof, may be implemented as computer readable code on the computer system 800. In one example, the map server 102, the transportation server 104, and/or the database server 106 of FIG. 1 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the driving assistance method of FIGS. 7A-7B.

The computer system 800 may include a processor 802 that may be a special purpose or a general-purpose processing device. The processor 802 may be a single processor, multiple processors, or combinations thereof. The processor 802 may have one or more processor "cores." Further, the processor 802 may be coupled to a communication infrastructure 804, such as a bus, a bridge, a message queue, the communication network 118, multi-core message-passing scheme, and the like. The computer system 800 may further include a main memory 806 and a secondary memory 808. Examples of the main memory 806 may include RAM, ROM, and the like. The secondary memory 808 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer readable recording media.

The computer system 800 may further include an I/O port 810 and a communication interface 812. The I/O port 810 may include various input and output devices that are configured to communicate with the processor 802. Examples of the input devices may include a keyboard, a mouse, a joystick, a touchscreen, a microphone, and the like. Examples of the output devices may include a display screen, a speaker, headphones, and the like. The communication interface 812 may be configured to allow data to be transferred between the computer system 800 and various devices that are communicatively coupled to the computer system 800. Examples of the communication interface 812 may include a modem, a network interface, i.e., an Ethernet card, a communications port, and the like. Data transferred via the communication interface 812 may be signals, such as electronic, electromagnetic, optical, or other signals as will be apparent to a person of ordinary skill in the art. The signals may travel via a communications channel, such as the communication network 118, which may be configured to transmit the signals to the various devices that are communicatively coupled to the computer system 800. Examples of the communication channel may include a wired, wireless, and/or optical medium such as cable, fiber optics, a phone line, a cellular phone link, a radio frequency link, and the like. The main memory 806 and the secondary memory 808 may refer to non-transitory computer readable mediums that may provide data that enables the computer system 800 to implement the driving assistance method illustrated in FIGS. 7A-7B.

Various embodiments of the disclosure provide the map server 102 for generating the digital autonomy map for the autonomous vehicle 110 for providing the real-time driving assistance to the autonomous vehicle 110. The map server 102 may be configured to extract the historical autonomy levels associated with the one or more route segments of at least one route (such as the first route) connecting the source location and the destination location of the autonomous vehicle 110. The map server 102 may be further configured to determine the autonomy level for each route segment based on at least the extracted historical autonomy levels. The map server 102 may be further configured to generate the digital autonomy map including the one or more route segments of the first route. Each route segment on the digital autonomy map is tagged with the autonomy level. The generated digital autonomy map may be utilized by the autonomous vehicle 110 to control the transit operations between the source location and the destination location. The map server 102 may be further configured to receive the real-time autonomy levels from the autonomous vehicles 116 that may be currently traversing the one or more route segments of the first route. The autonomous vehicles 116 may be traversing ahead of the autonomous vehicle 110. The map server 102 may be further configured to dynamically update the autonomy level of each route segment on the digital autonomy map based on the received real-time autonomy levels to provide the real-time driving assistance to the autonomous vehicle 110.

Various embodiments of the disclosure provide a non-transitory computer readable medium having stored thereon, computer executable instructions, which when executed by a computer, cause the computer to execute operations for the map server 102 for generating the digital autonomy map for the autonomous vehicle 110 for providing the real-time driving assistance to the autonomous vehicle 110. The operations include extracting, by the map server 102 from the database server 106, the historical autonomy levels associated with the one or more route segments of at least one route (such as the first route) connecting the source location and the destination location of the autonomous vehicle 110. The operations further include determining, by the map server 102, the autonomy level for each route segment based on at least the extracted historical autonomy levels. The operations further include generating, by the map server 102, the digital autonomy map including the one or more route segments of the at least one route. Each route segment on the digital autonomy map may be tagged with the autonomy level. The digital autonomy map may be utilized by the autonomous vehicle 110 for controlling the transit operations between the source location and the destination location. The operations further include receiving, by the map server 102, the real-time autonomy levels from the autonomous vehicles 116 that are currently traversing the one or more route segments of the at least one route. The autonomous vehicles 116 may be traversing the one or more route segments ahead of the autonomous vehicle 110. The operations further include dynamically updating, by the map server 102, the autonomy level of each route segment of the at least one route on the digital autonomy map based on the received real-time autonomy levels for providing driving assistance to the autonomous vehicle 110.

Various embodiments of the disclosure provide a non-transitory computer readable medium having stored thereon, computer executable instructions, which when executed by a computer, cause the computer to execute operations for generating the digital autonomy map for the autonomous vehicle 110 for providing the real-time driving assistance to the autonomous vehicle 110. The operations include selecting, by the transportation server 104, at least one route (such as the first route) from the one or more routes. The at least one route connects the source location and the destination location of the autonomous vehicle 110. The at least one route may be selected from the one or more routes based on at least one of the overall autonomy level of each route, the real-time traffic conditions of each route, the real-time environmental conditions of each route, the trip time associated with each route, and the route preferences of the user 112 associated with the autonomous vehicle 110. The user 112 may be at least one of a driver or a passenger associated with the autonomous vehicle 110. The driver may be selected from a set of available drivers based on at least the autonomy level of each route segment of the at least one route. The operations further include generating, by the transportation server 104, the historical autonomy levels associated with the one or more route segments of the at least one route. The operations further include determining, by the map server 102, the autonomy level for each route segment based on at least the generated historical autonomy levels. The operations further include generating, by the map server 102, the digital autonomy map including the one or more route segments of the at least one route. Each route segment on the digital autonomy map may be tagged with the autonomy level. The digital autonomy map may be utilized by the autonomous vehicle 110 for controlling the transit operations between the source location and the destination location. The operations further include receiving, by the map server 102, the real-time autonomy levels from the autonomous vehicles 116 that are currently traversing the one or more route segments of the at least one route. The autonomous vehicles 116 may be traversing the one or more route segments ahead of the autonomous vehicle 110. The operations further include dynamically updating, by the map server 102, the autonomy level of each route segment of the at least one route on the digital autonomy map based on the received real-time autonomy levels for providing driving assistance to the autonomous vehicle 110.

The disclosed embodiments encompass numerous advantages. Exemplary advantages of the method and the system include generating the digital autonomy map for an autonomous vehicle such as the autonomous vehicle 110. The digital autonomy map may be utilized, by a transport service provider (e.g., a cab service provider such as OLA), to control and manage the transit operations of the autonomous vehicles from one location to another location in an effective and efficient manner. For example, for deployment of the autonomous vehicle 110 for a trip by a transport service provider, various factors such as conditions of the selected route for the trip, weather conditions associated with the selected route, health of the autonomous vehicle 110, traffic conditions associated with the selected route, necessity of a driver for driving the autonomous vehicle 110, the autonomy levels of various route segments of the selected route, and the like, may be taken into consideration for ensuring a hassle free ride that is safe for the autonomous vehicle 110 and the user 112 (such as the driver or the passenger). The deployment of the autonomous vehicle 110 along with the driver is not always feasible considering an overall increased cost of the trip that may not be desirable. Thus, the need of the driver for the autonomous vehicle 110 may be determined based on the autonomy levels of the various route segments of the selected route. Further, for efficient computation of the autonomy levels, various internal and external factors are taken into consideration for dynamically updating the digital autonomy map in real-time. Further, the digital autonomy map may be utilized to ensure that the driver is well aware of the route segment switching by communicating various notifications, instructions, or commands. Thus, the generation of the digital autonomy map and the dynamic updating of the generated digital autonomy map after a regular interval of time may facilitate the efficient and effective planning for the trip prior to the deployment of the autonomous vehicle 110. Such efficient and effective planning for the trip may assist the transport service provider to optimize utilization of available resources, improve user comfort and safety, and thereby improve cost effectiveness of the trip by reducing vehicle maintenance and driver costs, thereby enhancing the efficiency of the trip.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the disclosure provide, among other features, systems and methods for providing driving assistance to various autonomous vehicles. While various exemplary embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A driving assistance method, comprising:
extracting, by a server from a database, historical autonomy levels of one or more route segments of a route connecting a source location and a destination location of a first autonomous vehicle,
wherein the historical autonomy levels are generated based on at least one or more historical driving conditions on the one or more route segments of one or more third autonomous vehicles that have traversed historically via one or more routes connecting the source location and the destination location;
determining, by the server, one or more autonomy levels for the one or more route segments, respectively, based on the extracted historical autonomy levels to manage and control transit operation between the source location and the destination location;
rendering, by the server, a digital autonomy map including the one or more route segments of the route,
wherein the one or more route segments on the digital autonomy map are tagged with the determined one or more autonomy levels, respectively, and
wherein the rendered digital autonomy map is utilized by the first autonomous vehicle for controlling transit operations between the source location and the destination location;
receiving, by the server, real-time autonomy levels from one or more second autonomous vehicles that are currently traversing the one or more route segments,
wherein the one or more second autonomous vehicles are traversing the one or more route segments ahead of the first autonomous vehicle;
proportionately adjusting, by the server, the one or more autonomy levels of the one or more route segments, respectively, on the digital autonomy map based on vehicle category, wherein proportionately adjusting the one or more autonomy levels corresponds to dynamically updating the one or more autonomy levels of the first autonomous vehicle by a value in accordance with the one or more autonomy levels of the second autonomous vehicle, wherein the value by which the one or more autonomy levels of the first autonomous vehicles is adjusted is different from the one or more autonomy levels of the second autonomous vehicles based on the vehicle category, wherein the first autonomous vehicle belongs to a first vehicle category and the second autonomous vehicle belongs to a second vehicle category,
and wherein the first autonomous vehicle controls transit operations on remaining part of the route based on updated digital autonomy map; and
generating, by the server, one or more notifications to alert a user of the first autonomous vehicle that is currently traversing on a first route segment tagged with a first autonomy level in the digital autonomy map, of a potential change in vehicle settings of the first autonomous vehicle,
wherein the one or more notifications indicating the potential change in the vehicle settings are generated based on and prior to a switch of the first autonomous vehicle from the first route segment to a second route segment that is tagged with a second autonomy level on the digital autonomy map,
wherein the one or more route segments include the first route segment and the second route segment, and
wherein the one or more notifications include an estimated time duration and/or a distance after which the first autonomous vehicle is to switch from the first autonomy level to the second autonomy level.

2. The driving assistance method of claim 1, wherein the historical autonomy levels are generated based on the one or more historical driving conditions of the one or more route segments of the route and historical configuration of one or more sensors and processing components of the one or more third autonomous vehicles.

3. The driving assistance method of claim 2, wherein the historical autonomy levels are extracted based on a time or a time duration of a day associated with the first autonomous vehicle.

4. The driving assistance method of claim 1, further comprising receiving, by the server, first sensor data from the first autonomous vehicle and second sensor data from the one or more second autonomous vehicles,
wherein the first sensor data and the second sensor data include global positioning system (GPS) data, image data of an exterior environment, radio detection and ranging (RADAR) data, ultrasonic data, and light detection and ranging (LiDAR) data.

5. The driving assistance method of claim 4, further comprising retrieving, by the server, real-time route information of the route from a route database, real-time traffic information of the route from a traffic database, and real-time weather information of the route from a weather database.

6. The driving assistance method of claim 5, wherein the real-time route information includes a route segment type, speed restriction information, and obstruction information of each route segment of the one or more route segments, the real-time traffic information includes real-time traffic conditions associated with each route segment of the route, and the real-time weather information includes real-time temperature, fog, light, humidity, and pollution information associated with each route segment of the route.

7. The driving assistance method of claim 5, wherein the one or more autonomy levels of the one or more route segments, respectively, are further dynamically updated on the digital autonomy map based on the first sensor data, the second sensor data, the real-time route information, the real-time traffic information, and the real-time weather information.

8. The driving assistance method of claim 7, wherein the one or more autonomy levels of the one or more route segments, respectively, are further dynamically updated based on:
a vehicle category of at least one of the first autonomous vehicle and the one or more second autonomous vehicles, and
an operating state of one or more sensors and processing components of the first autonomous vehicle and the one or more second autonomous vehicles that are traversing the one or more route segments ahead of the first autonomous vehicle.

9. The driving assistance method of claim 1, further comprising rendering, by the server, the digital autonomy map on a navigation device of the first autonomous vehicle,
wherein the transit operations between the source location and the destination location are controlled based on navigation and autonomy information indicated by the rendered digital autonomy map.

10. The driving assistance method of claim 1, wherein the digital autonomy map is generated based on a number of sensors and processing components in the first autonomous vehicle, the one or more second autonomous vehicles, and the one or more third autonomous vehicles.

11. The driving assistance method of claim 1, wherein the management and the control of the transit operation between the source location and the destination location is based on at least a necessity of a driver for driving the first autonomous vehicle,
wherein the necessity of the driver for driving the first autonomous vehicle is determined based on the one or more autonomy levels for the one or more route segments of a selected route to render optimized utilization of available resources.

12. A driving assistance system, comprising:
a server comprising circuitry configured to:
extract, from a database, historical autonomy levels associated with one or more route segments of a route that connects a source location and a destination location of a first autonomous vehicle,
wherein the historical autonomy levels are generated based on at least one or more historical driving conditions on the one or more route segments of one or more third autonomous vehicles that have traversed historically via one or more routes connecting the source location and the destination location;
determine one or more autonomy levels for the one or more route segments based on the extracted historical autonomy levels to manage and control transit operation between the source location and the destination location;
render a digital autonomy map that includes the one or more route segments,
wherein the one or more route segments on the digital autonomy map are tagged with the determined one or more autonomy levels, respectively, and
wherein the rendered digital autonomy map is utilized by the first autonomous vehicle to control transit operations between the source location and the destination location;
receive real-time autonomy levels from one or more second autonomous vehicles that currently traverse the one or more route segments,
wherein the one or more second autonomous vehicles traverse the one or more route segments ahead of the first autonomous vehicle;
proportionately adjust the one or more autonomy levels of the one or more route segments, respectively, on the digital autonomy map based on a vehicle category, wherein proportionately adjusting the one or more autonomy levels corresponds to dynamically updating the one or more autonomy levels of the first autonomous vehicle by a value in accordance with the one or more autonomy levels of the second autonomous vehicle, wherein the value by which the one or more autonomy levels of the first autonomous vehicles is adjusted is different from the one or more autonomy levels of the second autonomous vehicles based on the vehicle category, wherein the first autonomous vehicle belongs to a first vehicle category and the second autonomous vehicle belongs to a second vehicle category,
and wherein the first autonomous vehicle controls transit operations on remaining part of the route based on updated digital autonomy map; and
generate one or more notifications to alert a user of the first autonomous vehicle that is currently travelling on a first route segment tagged with a first autonomy level in the digital autonomy map, of a potential change in vehicle settings of the first autonomous vehicle,
wherein the one or more notifications indicating the potential change in the vehicle settings are generated based on and prior to a switch of the first autonomous vehicle from the first route segment to a second route segment that is tagged with a second autonomy level in the digital autonomy map,
wherein the one or more route segments include the first route segment and the second route segment, and
wherein the one or more notifications include estimated time duration and/or a distance after which the first autonomous vehicle is to switch from the first autonomy level to the second autonomy level.

13. The driving assistance system of claim 12, wherein the historical autonomy levels are generated based on the one or more historical driving conditions of the one or more route segments of the route and historical configuration of one or more sensors and processing components of the one or more third autonomous vehicles.

14. The driving assistance system of claim 12, wherein the circuitry is further configured to retrieve real-time route information of the route from a route database, real-time traffic information of the route from a traffic database, and real-time weather information of the route from a weather database.

15. The driving assistance system of claim 14, wherein the real-time route information includes a route segment type, speed restriction information, and obstruction information of each route segment of the one or more route segments,
the real-time traffic information includes real-time traffic conditions associated with each route segment of the route, and
the real-time weather information includes real-time temperature, fog, light, humidity, and pollution information associated with each route segment of the route.

16. The driving assistance system of claim 14, wherein the circuitry is further configured to dynamically update the one or more autonomy levels of the one or more route segments, respectively, on the digital autonomy map based on first sensor data, second sensor data, the real-time route information, the real-time traffic information, and the real-time weather information.

17. The driving assistance system of claim 16, wherein the circuitry is further configured to dynamically update the one or more autonomy levels of the one or more route segments on the digital autonomy map based on: a vehicle category of at least one of the first autonomous vehicle and the one or more second autonomous vehicles, and
an operating state of one or more sensors and processing components of the first autonomous vehicle and the one or more second autonomous vehicles.

18. The driving assistance system of claim 12, wherein the circuitry is further configured to render the digital autonomy map on a navigation device of the first autonomous vehicle, and wherein the transit operations between the source location and the destination location are controlled based on navigation and autonomy information indicated by the rendered digital autonomy map.

19. A driving assistance system, comprising:
a server comprising circuitry configured to:
select at least one route from one or more routes, wherein the at least one route connects a source location and a destination location of a first autonomous vehicle; and generate historical autonomy levels associated with one or more route segments of the at least one route,
wherein the historical autonomy levels are generated based on at least one or more historical driving conditions on the one or more route segments of one or more third autonomous vehicles that have traversed historically via the one or more routes connecting the source location and the destination location;

determine one or more autonomy levels for the one or more route segments, respectively, based on the generated historical autonomy levels, to manage and control transit operation between the source location and the destination location;

render a digital autonomy map including the one or more route segments of the at least one route,
wherein the one or more route segments on the digital autonomy map are tagged with the determined one or more autonomy levels, respectively, and
wherein the rendered digital autonomy map is utilized by the first autonomous vehicle to control transit operations between the source location and the destination location;

receive real-time autonomy levels from one or more second autonomous vehicles that currently traverse the one or more route segments of the at least one route,
wherein the one or more second autonomous vehicles traverse the one or more route segments ahead of the first autonomous vehicle;

proportionately adjust the one or more autonomy levels of the one or more route segments, respectively, on the digital autonomy map based on a vehicle category, wherein proportionately adjusting the one or more autonomy levels corresponds to dynamically updating the one or more autonomy levels of the first autonomous vehicle by a value in accordance with the one or more autonomy levels of the second autonomous vehicle, wherein the value by which the one or more autonomy levels of the first autonomous vehicles is adjusted is different from the one or more autonomy levels of the second autonomous vehicles based on the vehicle category, wherein the first autonomous vehicle belongs to a first vehicle category and the second autonomous vehicle belongs to a second vehicle category, and wherein the first autonomous vehicle controls transit operations on remaining part of the at least one route based on updated digital autonomy map; and generate one or more notifications to alert a user of the first autonomous vehicle that is currently travelling on a first route segment tagged with a first autonomy level on the digital autonomy map, of a potential change in vehicle settings of the first autonomous vehicle,
wherein the one or more notifications indicating the potential change in the vehicle settings are generated based on and prior to a switch of the first autonomous vehicle from the first route segment to a second route segment that is tagged with a second autonomy level on the digital autonomy map,
wherein the one or more route segments include the first route segment and the second route segment, and
wherein the one or more notifications include estimated time duration and/or a distance after which the first autonomous vehicle is to switch from the first autonomy level to the second autonomy level.

20. The driving assistance system of claim 19, wherein the circuitry of the server is further configured to select the at least one route from the one or more routes based on an overall autonomy level of each route of the one or more routes, real-time traffic conditions of each route, real-time environmental conditions of each route, a trip time associated with each route, and route preferences of the user associated with the first autonomous vehicle,
wherein the user is at least one of a driver or a passenger associated with the first autonomous vehicle, and wherein the driver is selected from a set of available drivers based on the one or more autonomy levels of the one or more route segments, respectively, of the at least one route.

21. The driving assistance system of claim 19, wherein the first autonomy level is different from the second autonomy level.

* * * * *